United States Patent [19]
Gemma et al.

[11] Patent Number: 6,125,095
[45] Date of Patent: Sep. 26, 2000

[54] LUMINESCENT RECORDING LAYER HOLDING A PLURALITY OF POSITIVE OR NEGATIVE CHARGES

[75] Inventors: Nobuhiro Gemma; Hiroyuki Hieda, both of Yokohama; Kuniyoshi Tanaka, Miura, all of Japan

[73] Assignee: Kabushiki Kaisha Toshiba, Kawasaki, Japan

[21] Appl. No.: 09/028,477

[22] Filed: Feb. 24, 1998

[30] Foreign Application Priority Data

Feb. 25, 1997 [JP] Japan .................................. 9-040890
Apr. 8, 1997 [JP] Japan .................................. 9-089215

[51] Int. Cl.⁷ .............................. G11B 9/00; G01N 1/00
[52] U.S. Cl. ..................... 369/126; 369/284; 369/288; 252/301.17; 428/917
[58] Field of Search .................... 369/288, 284, 369/126, 100, 106; 428/69, 70, 917; 359/241, 321; 365/106, 118, 119, 151; 252/301.16, 301.17

[56] References Cited

U.S. PATENT DOCUMENTS

| | | | |
|---|---|---|---|
| 4,819,210 | 4/1989 | Miura et al. | 369/284 |
| 5,036,208 | 7/1991 | Murata et al. | 250/487.1 |
| 5,675,532 | 10/1997 | Gemma et al. | 365/151 |
| 5,882,761 | 3/1999 | Kawami et al. | 428/69 |
| 5,932,139 | 8/1999 | Oshima et al. | 252/301.16 |

FOREIGN PATENT DOCUMENTS 61-129753  6/1986  Japan .

OTHER PUBLICATIONS

E. Betzig et al., "Near–field magneto–optics and high density data storage", Appl. Phys. Lett. , vol. 61 (2), pp. 142–144, Jul. 13, 1992.

S. Hosaka et al., "Scanning near–field optical microscope with a laser diode and nanometer–sized bit recording", Thin Solid Films, vol. 273, pp. 122–127, 1996.

S. Hosaka et al., "Phase change recording using a scanning near–field optical microscope", J. Appl. Phys., vol. 79 (1), pp. 8082–8086, May 15, 1996.

*Primary Examiner*—Tan Dinh
*Assistant Examiner*—Kim-Kwok Chu
*Attorney, Agent, or Firm*—Finnegan, Henderson, Farabow, Garrett & Dunner, L.L.P.

[57] ABSTRACT

This invention is characterized in that information is recorded by injecting electric charge into a charge holding region made from a donor or acceptor, and the recorded information is reproduced by using changes in luminescence characteristics of the luminescent material contained in the charge holding region or a light emitting region formed near the charge holding region, that occur in accordance with the charge condition of the charge holding region.

20 Claims, 9 Drawing Sheets

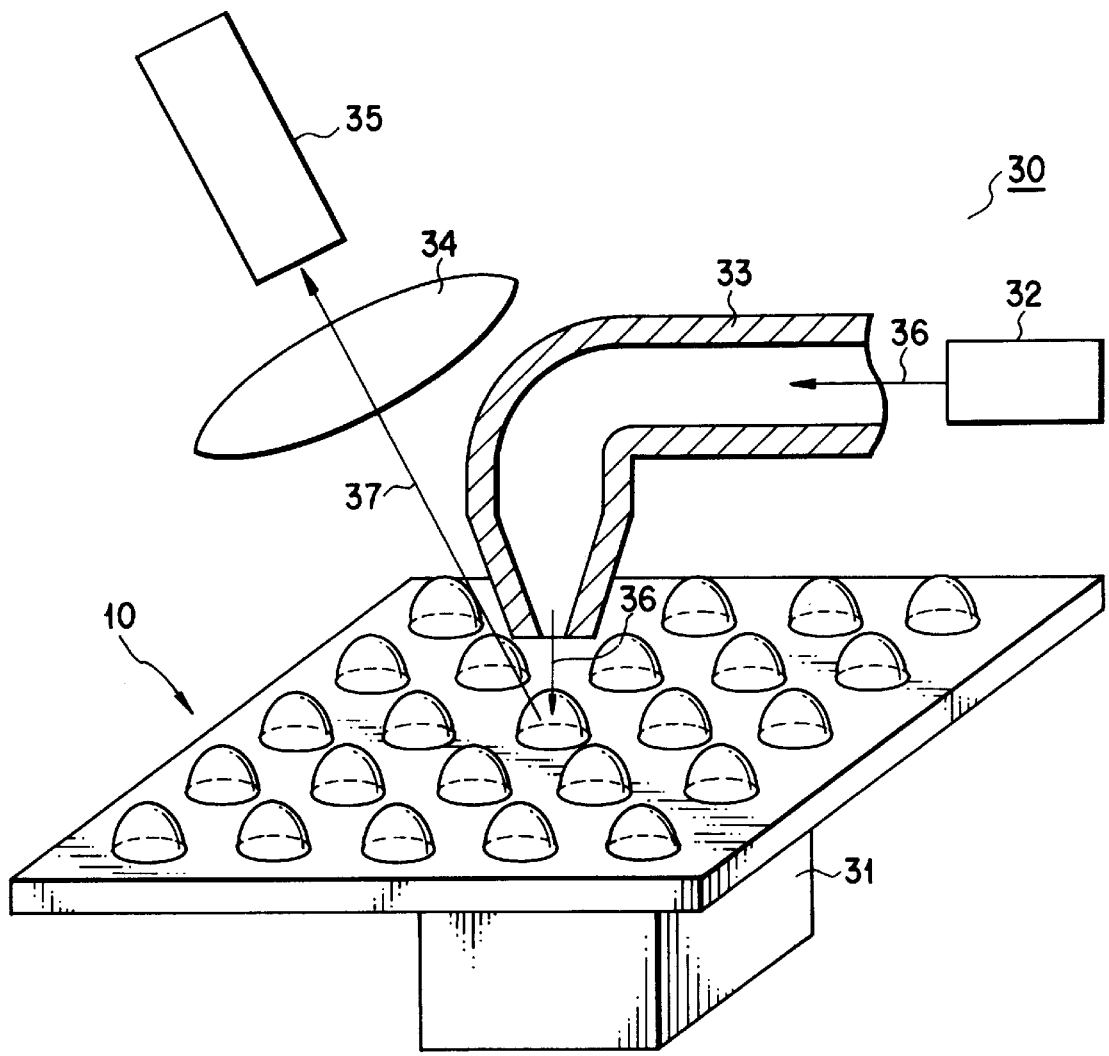
F I G. 7

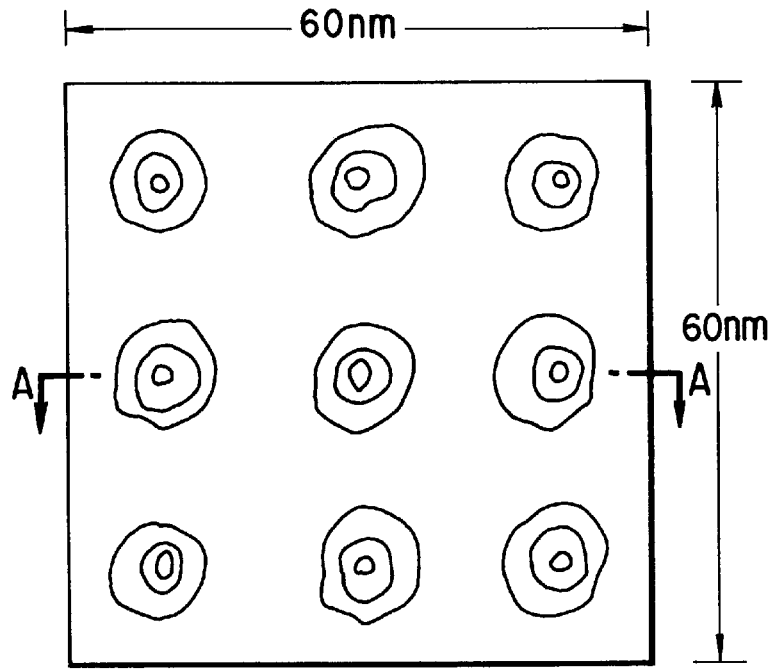
F I G. 14
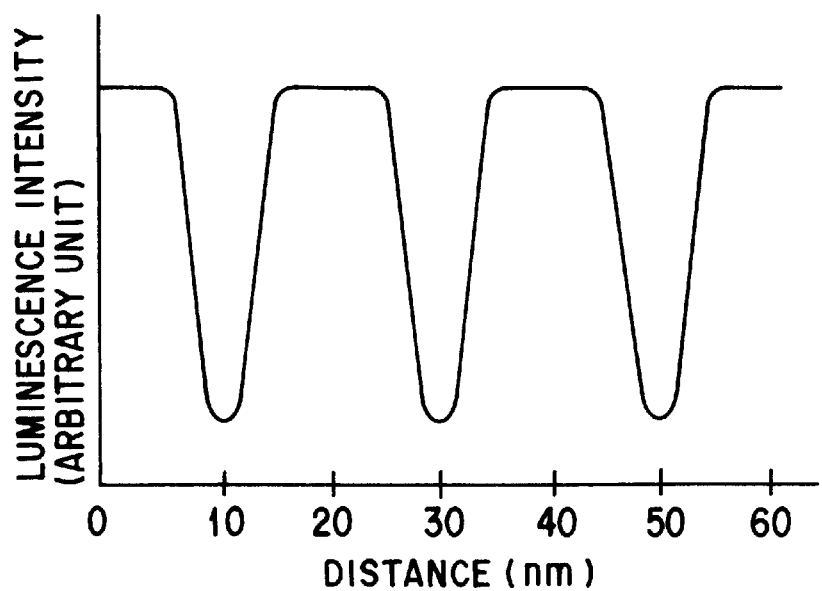
F I G. 15

LUMINESCENT RECORDING LAYER HOLDING A PLURALITY OF POSITIVE OR NEGATIVE CHARGES

BACKGROUND OF THE INVENTION

The present invention relates to a recording medium, a recording method, a reproducing method, an erasing method, a reproducing apparatus, and a recording-reproducing apparatus and, more particularly, to a recording medium, a recording method, a reproducing method, an erasing method, a reproducing apparatus, and a recording-reproducing apparatus in which the size of a region for recording information is the wavelength of light or smaller.

In the recent information society, the amount of information keeps on increasing. Therefore, the advent of a recording-reproducing method having a recording density extraordinarily higher than the conventional recording densities and a recording apparatus and a reproducing apparatus based on the method is being expected.

As techniques for realizing super-high density recording, a number of scanning probe techniques such as an STM, an AFM, and a Near-field Scanning Optical Microscope (NSOM) are being studied. In effect, these techniques are beginning to be applied to storage devices. In particular, an NSOM has attracted a great deal of attention as a means for realizing optical recording in which the bit size (the size of the unit recording area) is the wavelength of light or smaller.

Betzig et al. have tried Magneto-Optic (MO) information recording and reproduction by irradiating light from an Ar ion laser onto a Co/Pt multilayered film by using an NSOM probe and formed a recording pattern 60 nm in diameter (Appl. Phys. Lett. 61, 142(1992)).

Also, Hosaka et al. have realized phase change recording on a scale of a diameter of 50 nm by irradiating light from a semiconductor laser onto a 30-nm thick $Ge_2Sb_2Te_5$ film by using an NSOM probe (Thin Solid Films 273, 122(1996), J. Appl. Phys. 79, 8082(1996)).

These researches have proven that recording on a scale of the wavelength of light or smaller is possible by the application of an NSOM to a recording-reproducing method using MO or phase change which are presently used in optical recording. However, these methods have several problems.

First, bit size control is very difficult to perform, regardless of which of MO or phase change is used, because it is necessary to heat to a predetermined temperature by using absorption of a laser beam when information is recorded.

To decrease the bit size, an NSOM probe with a small aperture diameter must be used so that the spot size of light decreases. However, it is very difficult to manufacture an NSOM probe with a small aperture diameter.

Also, even if it is possible to manufacture an NSOM probe with a small aperture diameter, the intensity of light irradiated on a recording medium lowers as the aperture diameter of the NSOM probe is decreased. In the methods described above, high-power light must be irradiated in recording. For this purpose, light having higher power must be sent to the optical fiber of the NSOM probe. Consequently, the end portion of the NSOM probe is heated to a considerably high temperature, and this can lead to peeling of the metal covering the end portion.

Furthermore, even if the spot size is thus decreased, the bit size is increased by the effect of heat diffusion in the recording medium. This also makes the bit size difficult to control.

Second, the reproduction signal is weakened as the bit size is decreased, and this makes detection difficult. For example, the Kerr rotation angle is small in the recording-reproducing method using MO. Therefore, if the bit size is decreased, a weak reproduction signal becomes difficult to detect.

In the recording-reproducing method using phase change, as the bit size is decreased, the difference in reflectance between the recording area and non-recording area decreases. According to the results of experiments by Hosaka et al. described above, even when the bit size is about a few tens of nm, the intensity difference between a reproduction signal corresponding to information "0" and a reproduction signal corresponding to information "1", i.e., the reflectance difference decreases at a ratio larger than the reduction ratio of the bit size. This makes detection (identification) of reproduction signals difficult. Although no experimental result is obtained about the reflectance difference when the bit size is further decreased, it is readily predicted that the difference further decreases.

Increasing the recording density to a super high density of $terabit/cm^2$ or more amounts to decreasing the size of the unit recording area to 10 nm or less. It is considered that such super-high density recording using NSOM techniques is possible in principle. As described above, however, the various technical problems arise when the conventional recording media are used to realize this super-high density recording. Accordingly, the advent of an entirely novel recording-reproducing technique effective when the size of the unit recording area is on a nanometer scale is being expected.

BRIEF SUMMARY OF THE INVENTION

As described above, the advent of a recording-reproducing method capable of a super-high recording density of $terabit/cm^2$ or more is being expected, and attempts are being made to apply scanning probe techniques, such as an STM, an AFM, and an NSOM, to the conventional recording-reproducing methods. However, these methods presently have the various technical problems and have not been put into practical use yet.

The present invention has been made in consideration of the above situation and has as its object to provide a recording medium, a recording-reproducing method, a recording apparatus, and a reproducing apparatus capable of realizing a super-high recording density of $terabit/cm^2$ or more.

To achieve the above object, the present invention provides a recording medium comprising an electrically insulating under-layer, and a plurality of charge holding regions juxtaposed at predetermined intervals on the under-layer, containing a luminescent material, and capable of holding positive or negative electric charge.

The present invention provides a recording medium comprising an electrically insulating under-layer, a plurality of charge holding regions juxtaposed at predetermined intervals on the under-layer and capable of holding positive or negative electric charge, and a light emitting region arranged adjacent to the charge holding regions and containing a luminescent material.

The present invention provides a recording method for recording information on a recording medium comprising a recording area having a charge holding region capable of holding positive or negative electric charge, and containing a luminescent material in at least a portion of the recording area, comprising the step of charging the charge holding region.

The present invention provides an erasing method for erasing information recorded on a recording medium comprising a recording area having a charge holding region capable of holding positive or negative electric charge, and containing a luminescent material in at least a portion of the recording area, comprising the step of setting the charge holding region in a non-charged state.

The present invention provides a reproducing method for reproducing information recorded on a recording medium comprising a recording area having a charge holding region capable of holding positive or negative electric charge, and containing a luminescent material in at least a portion of the recording area, comprising the step of irradiating excitation light onto the recording area and detecting luminescence from the luminescent material in the recording area.

The present invention provides a reproducing apparatus for reproducing information recorded on a recording medium comprising a recording area having a charge holding region capable of holding positive or negative electric charge, and containing a luminescent material in at least a portion of the recording area, comprising a light source of excitation light for exciting the luminescent material, first light transmitting means for guiding the excitation light from the light source to the recording area, photodetecting means for detecting luminescence from the luminescent material in the recording area, second light transmitting means for guiding the luminescence from the recording area to the photodetecting means, control means for controlling a distance between the first light transmitting means and the recording area and a distance between the second light transmitting means and the recording area, and moving means for horizontally moving, rotating, or horizontally moving and rotating the recording medium.

The present invention provides a recording-reproducing apparatus for a recording medium comprising a recording area having a charge holding region capable of holding positive or negative electric charge, and containing a luminescent material in at least a portion of the recording area, comprising means for charging the charge holding region, a light source of excitation light for exciting the luminescent material, first light transmitting means for guiding the excitation light from the light source to the recording area, photodetecting means for detecting luminescence from the luminescent material in the recording area, second light transmitting means for guiding the luminescence from the recording area to the photodetecting means, control means for controlling a distance between the first light transmitting means and the recording area and a distance between the second light transmitting means and the recording area, and moving means for horizontally moving, rotating, or horizontally moving and rotating the recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a perspective view schematically showing a recording reproducing apparatus according to one embodiment of the present invention;

FIG. 14 is a view schematically showing an NSOM luminescent image in a recording medium according to still another example of the present invention; and FIG. 15 is a graph showing the luminescence intensity of the recording medium according to the example shown in FIG. 14.

DETAILED DESCRIPTION OF THE INVENTION

Figure 1A:
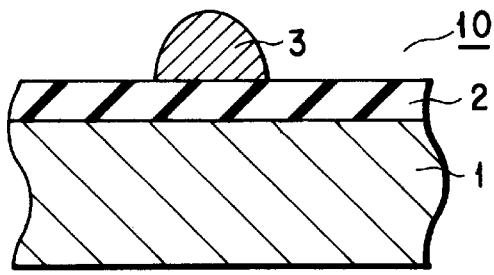
FIGS. 1A to 1G are sectional views showing recording media according to various embodiments of the present invention.

The present invention will be described in more detail below.

A recording medium of the present invention has an electrically insulating under-layer and a plurality of charge holding regions formed on the under-layer and capable of holding predetermined electric charge. Each charge holding region is formed as a nanometer-scale region and can hold positive or negative electric charge when a predetermined operation is performed. Also, these charge holding regions are separated from each other and can take different charged states. That is, these charge holding regions form a domain structure on the under-layer. Recording of information on the recording medium of the present invention is done by charging the charge holding regions. On the other hand, erasure of information recorded on the recording medium of the present invention is done by removing the electric charge held in the charge holding regions.

Additionally, the recording medium of the present invention contains a luminescent material in the charge holding regions or has a light emitting region containing a luminescent material near the charge holding regions. This luminescent material changes its luminescent state under the influence of an electric field surrounding the material. Accordingly, information recorded in the charge holding region is detected as a change in the luminescent state of the luminescent material.

In the present invention as described above, information is recorded and erased by controlling the charged states of the charge holding regions, and recorded information is output as luminescence from the luminescent material.

The recording medium of the present invention can take various forms. The structures of the recording medium of the present invention will be described in more detail below with reference to the accompanying drawings.

FIGS. 1A to 1G show recording media according to various embodiments of the present invention. FIGS. 1A to 1G are sectional views.

Recording media 10 shown in FIGS. 1A to 1G have a conductive or semiconductive substrate 1 on one major surface of which an insulating film 2 is formed as an under-layer, and a charge holding region 3 formed on the insulating film 2. Reference numerals 4 and 5 denote continuous layers; and 6, a charge holding region. Note that in the recording media 10 shown in FIGS. 1A to 1G, the charge holding regions 3 and 6 and the layers 4 and 5 denoted by different numerals are made from different materials. Note also that these materials are not explained here and will be described in detail later.

Figure 1B:
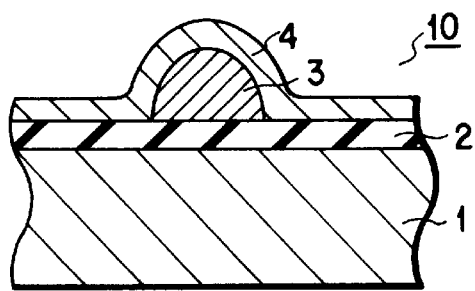
Figure 1C:
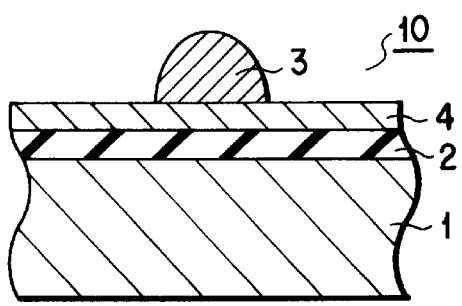
Figure 1D:
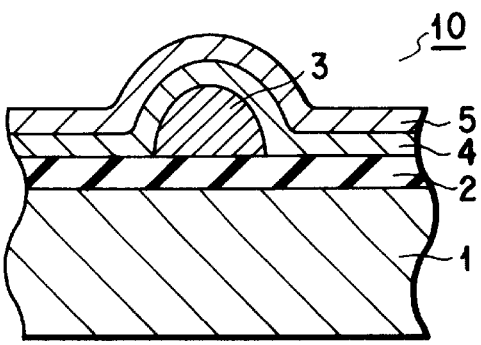
Figure 1E:
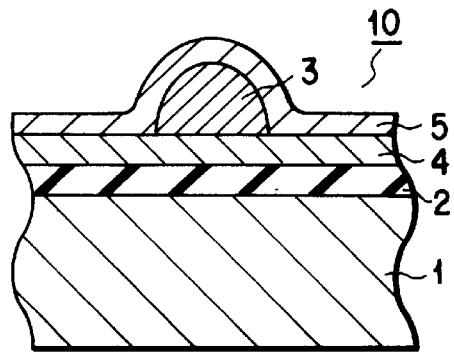
Figure 1F:
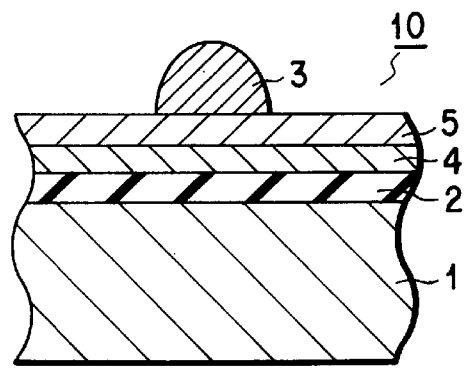
Figure 1G:
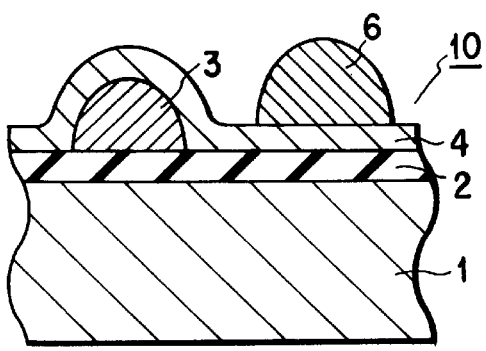

FIG. 1A shows a recording medium with a one-layered structure, FIGS. 1B and 1C show recording media with a two-layered structure, and FIGS. 1D to 1F show recording media with a three-layered structure. FIG. 1G also shows a recording medium with a three-layered structure in which a charge holding region 3, a continuous layer 4, and a charge holding region 6 form a three-layered structure.

FIGS. 1A to 1G show recording media in each of which a one-, two-, or three-layered film is stacked on the insulating film 2. However, the recording medium of the present invention can also have a structure in which a film including four or more layers is stacked. Furthermore, FIG. 1G shows a recording medium in which the two different charge holding regions 3 and 6 and the film 4 are combined. However, the recording medium of the present invention can also have a structure in which three or more different charge holding regions and a plurality of different films are combined.

In the recording media 10 shown in FIGS. 1A to 1G, the luminescent material can be contained in any of the charge holding regions 3 and 6 and the layers 4 and 5. This will be described below with reference to FIGS. 2A to 2I.

FIGS. 2A to 2I show recording media according to various embodiments of the present invention. FIGS. 2A to 2I are sectional views.

Figure 2A:
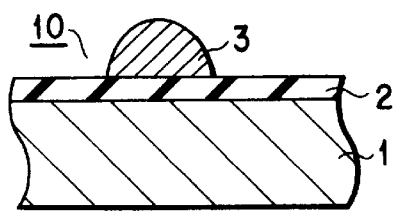
FIGS. 2A to 2I are sectional views showing recording media according to various embodiments of the present invention.

Referring to FIG. 2A, the luminescent material is contained in a charge holding region 3. That is, in a recording medium 10 shown in FIG. 2A, the charge holding region 3 functions as a light emitting region. When the luminescent material is thus contained in the charge holding region 3, the charge holding region 3 consists of the luminescent material and a donor or acceptor. Also, when the luminescent material is contained in the charge holding region 3, the luminescent material itself can be a donor or acceptor. If this is the case, the charge holding region 3 can be made only from the donor or acceptor luminescent material.

Figure 2B:
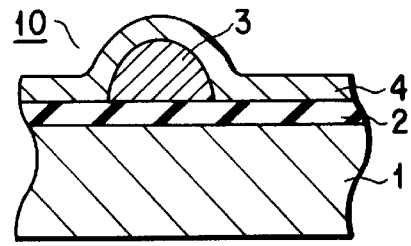

A recording medium 10 shown in FIG. 2B is the same as the recording medium 10 shown in FIG. 2A except that a layer 4 is formed on a charge holding region 3. That is, in the recording medium 10 shown in FIG. 2B, the luminescent material is similarly contained in the charge holding region 3. In FIG. 2B, the layer 4 can also be a protective layer for protecting the charge holding region 3. This protective layer is not particularly limited as long as the layer prevents damages to the charge holding region 3 and transmits excitation light for luminescent material and luminescence of the luminescent material.

Also, this layer 4 preferably improves the stability of the charged state of the charge holding region 3. That is, when the charge holding region 3 is made from an acceptor, the layer 4 is preferably made from an acceptor having electron affinity lower than that of the acceptor forming the charge holding region 3 or from a donor. When the charge holding region 3 is made from a donor, the layer 4 is preferably made from a donor having ionization potential higher than that of the donor forming the charge holding region 3 or from an acceptor. When the layer 4 is made from a material like this, electric charge can be effectively confined in the charge holding region 3. Accordingly, the stability of recording can be improved. Note that the difference between the ionization potentials or the electron affinities is preferably 0.1 eV or more because the recording stability can be improved more effectively in this case.

Figure 2C:
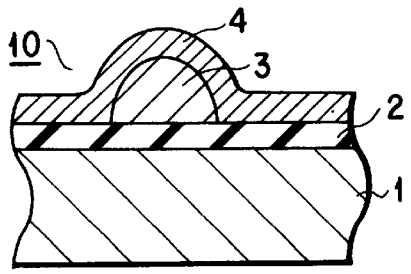

A recording medium 10 shown in FIG. 2C has a structure similar to that of the recording medium shown in FIG. 2B. Unlike the recording medium 10 shown in FIG. 2B, however, the luminescent material is contained in a layer 4. That is, the luminescent material need not always be contained in a charge holding region 3 and can be contained in the layer 4 formed adjacent to the charge holding region 3.

Figure 2D:
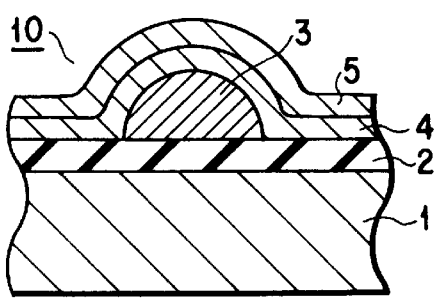

A recording medium 10 shown in FIG. 2D has the same structure as the recording medium 10 shown in FIG. 2B except that a layer 5 is formed on a layer 4. That is, the luminescent material is contained in a charge holding region 3. In the recording medium 10 shown in FIG. 2D, the layers 4 and 5 can be made from donors or acceptors. For example, the charge holding region 3 is made from an acceptor, the layer 4 is made from a material having electron affinity lower than that of the acceptor forming the charge holding region 3, and the layer 5 is made from a material having intermediate electron affinity between the electron affinities of the charge holding region 3 and the layer 4. In this structure, it is possible to generate electron-hole pairs in any of the charge holding region 3 and the layers 4 and 5 and hold these generated electrons and holes in the charge holding region 3 and the layer 4, respectively.

Alternatively, the charge holding region 3 is made from an acceptor, the layer 5 is made from a material having electron affinity lower than that of the acceptor forming the charge holding region 3, and the layer 4 is made from a material having intermediate electron affinity between the electron affinities of the charge holding region 3 and the layer 4. In this structure, it is possible to generate electron-hole pairs in any of the charge holding region 3 and the layers 4 and 5 and hold these generated electrons and holes in the charge holding region 3 and the layer 5, respectively. That is, the electrons and holes can be separated by the layer 4.

Figure 2E:
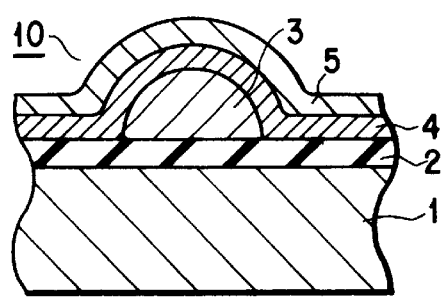
Figure 2F:
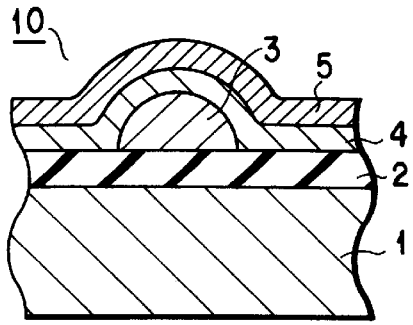

A recording medium 10 shown in FIG. 2E has the same structure as the recording medium 10 shown in FIG. 2D except that the luminescent material is contained in a layer 4. A recording medium 10 shown in FIG. 2F has the same structure as the recording medium 10 shown in FIG. 2D except that the luminescent material is contained in a layer 5. That is, the luminescent material need not always be contained in the layer 4 formed in contact with the charge holding region 3.

Figure 2G:
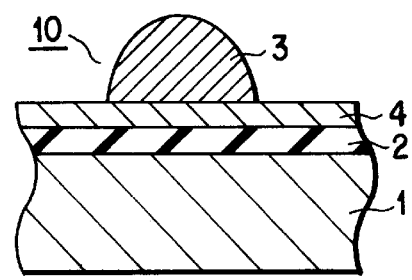

In a recording medium 10 shown in FIG. 2G, the luminescent material is contained in a charge holding region 3, and a layer 4 is formed between an insulating film 2 and the charge holding region 3. That is, the layer 4 can be formed not only above the charge holding region 3 but between the insulating film 2 and the charge holding region 3.

Figure 2H:
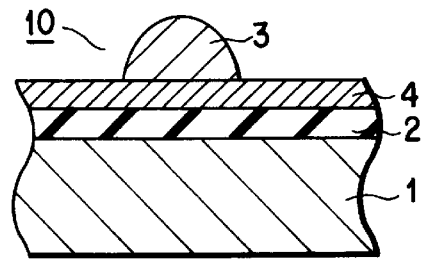
Figure 2I:
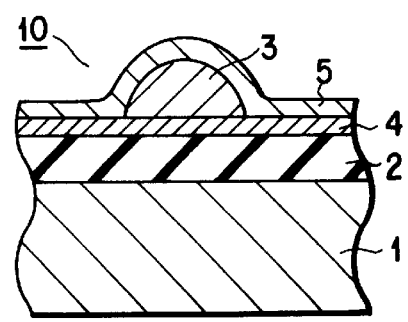

A recording medium 10 shown in FIG. 2H has the same structure as the recording medium 10 shown in FIG. 2G except that the luminescent material is contained in a layer 4. A recording medium 10 shown in FIG. 2I has the same structure as the recording medium 10 shown in FIG. 2H except that the luminescent material is contained in a layer 5.

In the recording medium 10 of the present invention as described above, the materials forming the charge holding region 3 and the layers 4 and 5 can be either donors or acceptors. Also, various combinations of the materials used in the charge holding region 3 and the layers 4 and 5 are possible, and the effect of the present invention can be obtained by any combination.

Methods for recording on the recording medium of the present invention will be described below. Recording on the recording medium of the present invention is performed by using an electrical means or an optical means.

Figure 3A:
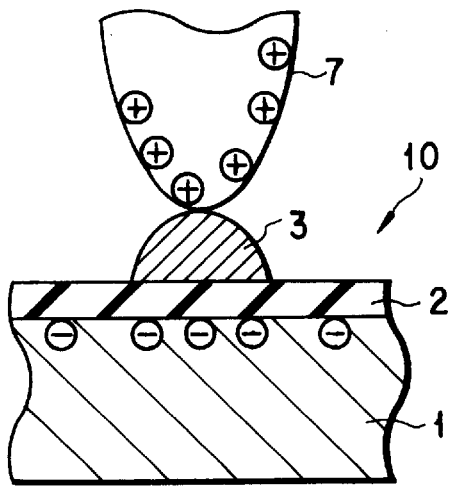
FIGS. 3A and 3B are sectional views schematically showing a recording method using an electrical means according to one embodiment of the present invention.
Figure 3B:
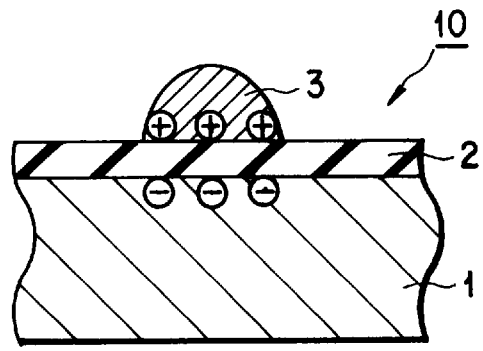

FIGS. 3A and 3B schematically show a recording method using an electrical means according to one embodiment of the present invention. FIGS. 3A and 3B are sectional views of the recording medium 10 shown in FIG. 1A.

When the charge holding region 3 is made from a donor, recording on the recording medium 10 shown in FIG. 3A is performed by, e.g., applying a positive voltage to the end portion of a charge injecting probe 7 and bringing the end portion of the probe 7 into contact with the charge holding region 3. Consequently, as shown in FIG. 3B, holes are injected into the charge holding region 3. That is, information is recorded on the recording medium 10.

When the layer 4 is formed on the charge holding region 3, recording is performed by bringing the probe 7 into contact with the layer 4.

Figure 4A:
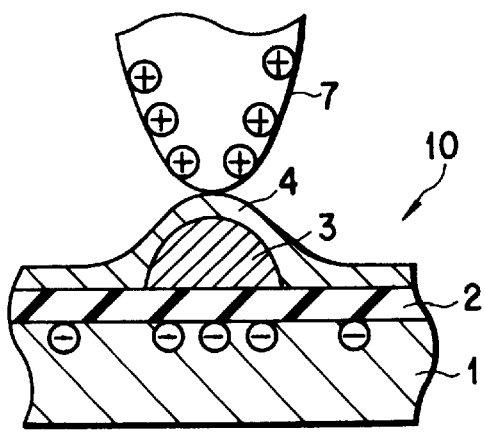
FIGS. 4A and 4B are sectional views schematically showing a recording method using an electrical means according to another embodiment of the present invention.
Figure 4B:
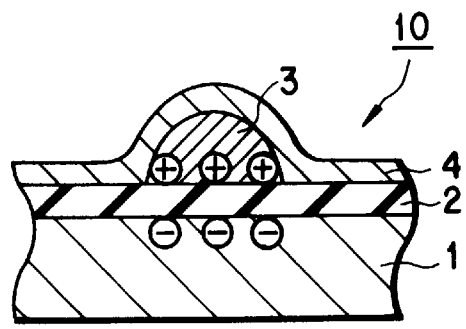

FIGS. 4A and 4B schematically show a recording method using an electrical means according to another embodiment of the present invention. FIGS. 4A and 4B are sectional views of the recording medium 10 shown in FIG. 1B.

As shown in FIG. 4A, holes are injected into the layer 4 when the probe 7 is brought into contact with the layer 4. If the charge holding region 3 and the layer 4 satisfy the above-mentioned relationship of ionization potential, the holes are injected from the layer 4 into the charge holding region 3. In this manner, information is recorded in the recording medium 10. If this is the case, the luminescent material can be contained in either of the charge holding region 3 or the layer 4.

As the charge injecting probe 7, the use of a probe of a scanning probe microscope such as an STM, an AFM, or an NSOM is desirable. The use of a probe like this makes super-high density recording feasible.

Cases in which the charge holding region 3 is made from a donor have been described above. In cases where the charge holding region 3 is made from an acceptor, however, recording can be performed by the same methods as above except that a negative voltage is applied to the end portion of the probe 7.

Recording methods using optical means will be described below.

Figure 5A:
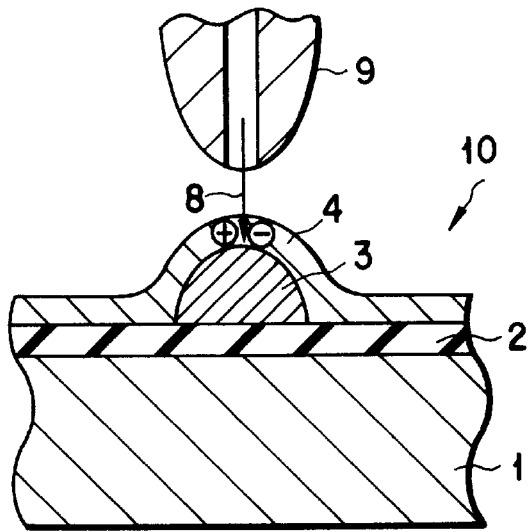
FIGS. 5A and 5B are sectional views schematically showing a recording method using irradiation of light according to one embodiment of the present invention.
Figure 5B:
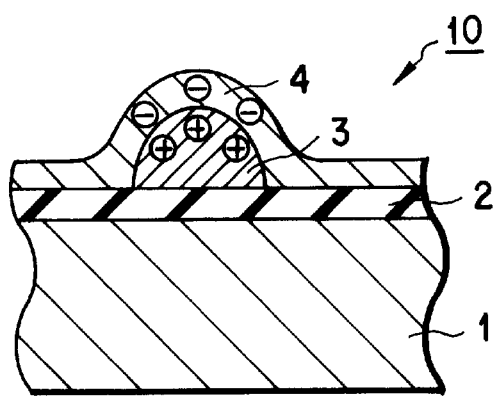

FIGS. 5A and 5B schematically show a recording method using irradiation of light according to one embodiment of the present invention. FIGS. 5A and 5B are sectional views of the recording medium 10 shown in FIG. 1B.

Recording on the recording medium 10 shown in FIG. 5A is performed by irradiating light 8 from a charge injecting probe 9 toward the charge holding region 3. When the light 8 is absorbed only in the layer 4 without being absorbed in the charge holding region 3, electron-hole pairs are generated in the layer 4 by this light irradiation. When the material forming the charge holding region 3 is more electron-donative than the material forming the layer 4, the holes generated in the layer 4 are injected into the charge holding region 3 as shown in FIG. 5B. That is, information is recorded in the recording medium 10.

As described above, equal amounts of electrons and holes are generated when recording is performed by irradiation of light. Therefore, in addition to the charge holding region 3 for holding one type of charges, i.e. holes or electrons, it is preferable to form the layer 4 for holding the other type of charges. That is, it is preferable to make the recording medium 10 have a multilayered structure.

The recording method for the recording medium 10 with a two-layered structure using irradiation of light has been described above. However, recording on a recording medium with a three-layered structure using irradiation of light can also be performed by a similar method.

Figure 6A:
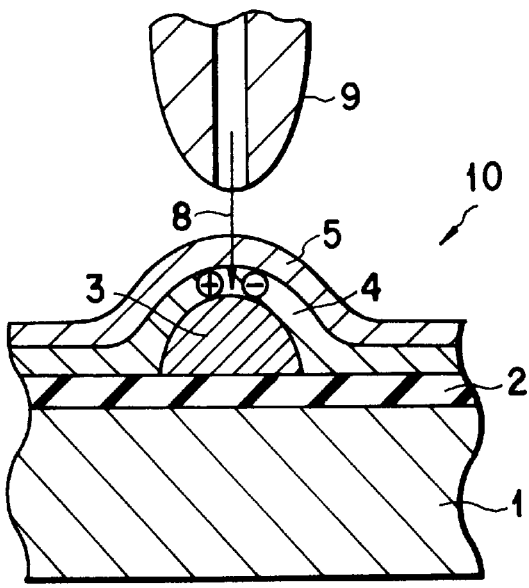
FIGS. 6A and 6B are sectional views schematically showing a recording method using irradiation of light according to another embodiment of the present invention.
Figure 6B:
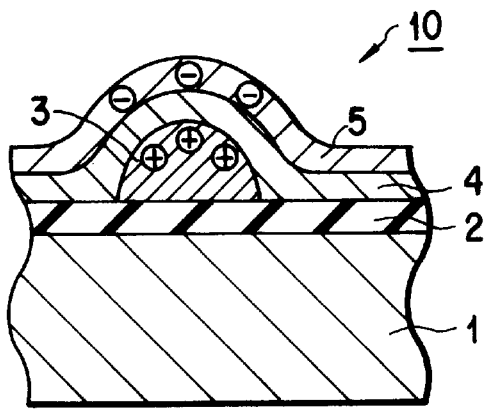

FIGS. 6A and 6B schematically show a recording method using irradiation of light according to another embodiment of the present invention. FIGS. 6A and 6B are sectional views of the recording medium 10 shown in FIG. 1C.

Recording on the recording medium 10 shown in FIG. 6A is performed in the same fashion as above by irradiating light 8 from a charge injecting probe 9 toward the charge holding region 3. When the light 8 is absorbed only in the layer 4 without being absorbed in the charge holding region 3 and the layer 5, electron-hole pairs are generated in the layer 4 by this light irradiation. When the material forming the charge holding region 3 is more electron-donative than the material forming the layer 4 and the material forming the layer 5, the holes generated in the layer 4 are injected into the charge holding region 3 as shown in FIG. 6B. Also, when the material forming the layer 5 is more electron-acceptive than the material forming the charge holding region 3 and the material forming the layer 4, the electrons generated in the layer 4 are localized in the layer 5 as shown in FIG. 6B. That is, the electrons and holes generated in the layer 4 are separated into the layer 5 and the charge holding region 3. In this manner, information is recorded in the recording medium 10.

The methods of generating electron-hole pairs in the layer 4 have been described above. However, electron-hole pairs can also be generated in the charge holding region 3 or the layer 5. Alternatively, electron-hole pairs can be generated in two or all three of the charge holding region 3 and the layers 4 and 5. The generation of electron-hole pairs in the charge holding region 3 and the layers 4 and 5 can be readily controlled on the basis of the relationships between the wavelength of the light 8 and the absorption bands of the materials forming the charge holding region 3 and the layers 4 and 5.

When recording is to be performed by irradiation of light, it is desirable to use an NSOM probe as the charge injecting probe 9. The use of this probe makes super-high density recording possible. Also, the use of a laser beam as the light 8 is preferable.

As described above, recording on the recording medium of the present invention can be performed by using an electrical means or an optical means. Although electric charge can be injected into the charge holding region 3 regardless of which means is used, the distribution of the charge changes in accordance with the type of means used.

For example, when an electrical means is used, as shown in FIGS. 3B and 4B, counter charges pairing with charges in the charge holding region 3 are induced at interface between the insulating film 2 and the conductor substrate 1. At this time, the charges in the charge holding region 3 are also localized near the insulating film 2. That is, an electric double layer is formed near the insulating film 2.

When an optical means is used, on the other hand, an electric double layer is formed near the interface between the charge holding region 3 and the layer 4 as shown in FIG. 5B, or formed near the layer 4 as shown in FIG. 6B.

An electric double layer forms a very intense electric field nearby. Therefore, the optical characteristics, particularly the emission characteristics of the luminescent material near this electric double layer are largely influenced. That is, the luminescent material near the electric double layer does not cause an emission even when a predetermined exciting operation is performed. In the present invention, therefore, electrically recorded information can be reproduced by using the emission of the luminescent material.

As described previously, in the recording medium of the present invention, information is recorded in the charge holding regions forming a domain structure, and the information is reproduced using changes in luminescence characteristics of the luminescent material used.

By using the domain structure as described above for recording information, following advantages can be obtained.

The first advantage is the ability to stabilize recording. That is, as described above, electric charge can be held in the charge holding region 3 for long time periods by forming the layer 4 made from a material having a predetermined ionization potential or electron affinity on the charge holding region 3. The use of the domain structure allows easy entrapment of electric charge and improves the recording lifetime.

The second advantage is the ease with which a unit recording area is miniaturized and its size is controlled. In the conventional recording methods in which an NSOM is applied to MO recording or phase change recording, the size of the unit recording area (recording bit) cannot be smaller than the spot diameter of light emitted from the end portion of an NSOM probe and is made larger than the spot diameter by conduction of heat.

In contrast, when one charge holding region 3 is used as an unit recording area in the recording medium of the present invention, the size of the charge holding region 3 is the size of the unit recording area. The size of the charge holding region 3 is readily controllable and can be easily controlled to 10 nm or less. Accordingly, the present invention enables super-high density recording of about terabits/$cm^2$ or more.

Also, in the present invention as described above, recording is performed by using the electronic process of injecting electric charge into the charge holding region 3. In the conventional recording methods in which an NSOM is applied to MO recording or phase change recording, it is necessary to raise the temperature of a recording area in recording information. That is, these methods require a long time to raise the recording area temperature for recording information. In the electronic method of the present invention, on the other hand, information can be recorded within about a time necessary for electrons or holes to transit. Since the transition speed of electrons or holes is very high, the present invention can realize an extremely high recording rate.

Also, in the present invention, electrically recorded information is reproduced by using the luminescence characteristics of the luminescent material. The following advantages can be obtained by the use of the luminescence characteristics of the luminescent material in the reproduction of recorded information.

The first advantage is the ability to detect luminescence as a reproduction signal at high sensitivity. Generally, the wavelength of luminescence differs from the wavelength of excitation light for exciting the luminescent material. Accordingly, excitation light and luminescence can be easily discriminated. Also, as actual optical characteristics of a single molecule, although the emission of luminescence is observed, none of the reflection and scattering is observed. In the present invention, therefore, it is possible to easily detect luminescence and obtain extremely high detection sensitivity compared to methods by which the difference in reflectance or the like is detected.

The second advantage of the use of the luminescence characteristics of the luminescent material in the reproduction of recorded information is a large intensity difference between two types of reproduction signals, i.e., a large difference between the intensity of a signal (0 signal) corresponding to information "0" and the intensity of a signal (1 signal) corresponding to information "1". In the conventional MO method, if the size of the unit recording area is on a nanometer scale, the intensity of the reproduction signal lowers. This makes the discrimination between the 0 signal and the 1 signal difficult. Also, in the conventional phase change method, the difference in reflectance decreases if the size of the unit recording area is about 10 nm. Consequently, in the phase change method, the difference between the intensities of the 0 signal and the 1 signal decreases to make the discrimination between the two signals difficult.

In contrast, in the present invention the 0 signal and the 1 signal can be easily discriminated even when the size of the unit recording area is decreased. In the present invention, recording corresponding to the 1 signal is performed by forming the electric double layer. As described previously, the luminescence characteristics of the luminescent material are largely affected by the electric field formed by the electric double layer. Therefore, no luminescence occurs even if a predetermined exciting operation is performed for the luminescent material affected by the electric field. That is, the intensity of the 1 signal does not depend upon the size of the unit recording area.

On the other hand, the state corresponding to the 0 signal is equivalent to the non-charged state of the charge holding region 3. In this state, an emission occurs when a predetermined exciting operation is performed because the luminescent material is unaffected by the electric field. The intensity of the 0 signal lowers as the size of the unit recording area is decreased. However, as described above, the discrimination of luminescence is much easier than the detection of the reflectance difference or the like. In the present invention, therefore, the 0 signal and the 1 signal can be easily discriminated even when the size of the unit recording area is about 10 nm.

As described above, according to the entirely novel recording-reproducing principle of the present invention, a high-intensity reproduction signal can be obtained even when the size of the unit recording area is on a nanometer scale (the wavelength of light or smaller). This allows miniaturizing the size of the unit recording area. Consequently, super-high density recording of terabits/cm$^2$ or more can be performed at a high recording and reproducing rate.

The materials used in the recording medium 10 will be described below.

As the material of the substrate 1, any of an insulator, a semiconductor, and a conductor can be used. Especially when at least a portion of the substrate 1 is made from a semiconductor or a conductor, the insulating film 2 as an under-layer can be formed by, e.g., oxidizing the surface of the substrate 1. When the substrate 1 is made from an insulator, the insulating film 2 need not be additionally formed.

The donors and acceptors used in the charge holding regions 3 and 6 and the layers 4 and 5 can be organic materials or inorganic materials. The effects of the present invention can be obtained when either material is used.

As the donor or acceptor used in the charge holding regions 3 and 6, the use of an organic compound having a structure represented by formula (1) below is desirable.

$$z-(X-Y)n \qquad (1)$$

In formula (1) above, Z represents an aromatic skeleton or alicyclic skeleton, Y represents a molecular skeleton having donor or acceptor properties, X represents a substituent group which bonds Z and Y or a plurality of Y's, and n represents an integer of 1 or more.

Practical examples of Z, X, and Y will be presented below. Of molecular skeletons represented by Y, those having donor properties are classified into (D1) to (D7), and those having acceptor properties are classified into (A1) to (A4).

As the donor used in the layers 4 and 5, it is preferable to use donor molecules at least partially containing the molecular skeletons classified into (D1) to (D7) below. Also, as the acceptor used in the layers 4 and 5, it is preferable to use acceptor molecules at least partially containing the molecular skeletons classified into (A1) to (A4) below.

As the luminescent material contained in one of the charge holding regions 3 and 6 and the layers 4 and 5, a general organic phosphor used in an EL element or the like can be used.

(D1) Fulvalen donors

TTF

TMTTF

DBTTF

MHTTF

BEDT-TTF

TSF

TMTSF

HMTSF

HMTTeF (D2) Sulfur-containing heterocyclic donors

Tetrathiotetracene (TTT)

Tetraselenatetracene (TST)

Tetrathionaphthalene

-continued
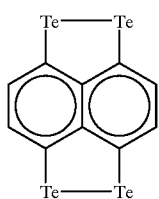
Tetrathioperillene
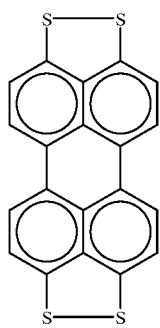
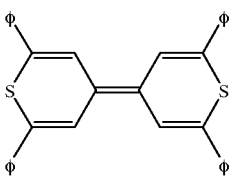
Tetraphenylbithiopyralidene (BTP)
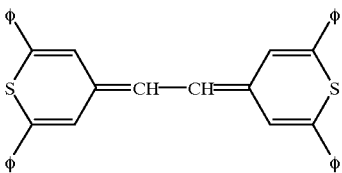
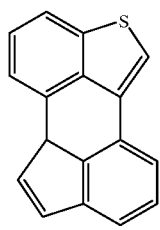
Bibenzothiohene (BBT)
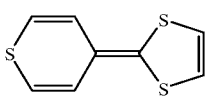
(D3) Amine donors
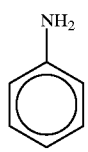
Aniline
-continued
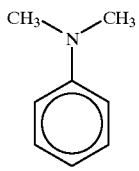
N-methylaniline
p-Phenylenediamine
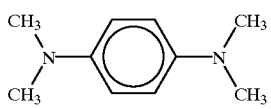
TMPD
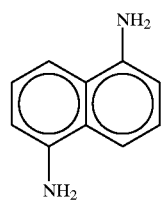
Diaminonaphthalene
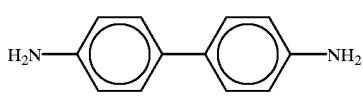
Benzidene
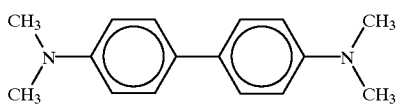
Tetramethylbenzidine
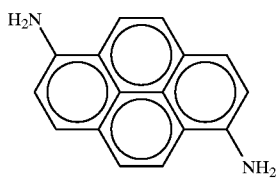
Diaminopyrene
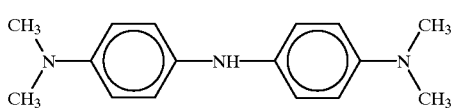
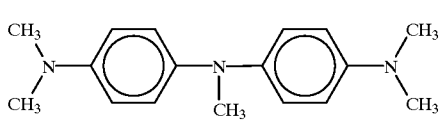
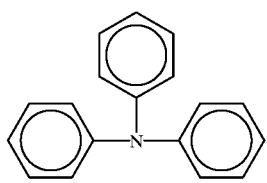

-continued
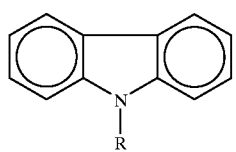
(D4) Metal complex donors
Fe
Ferrocene
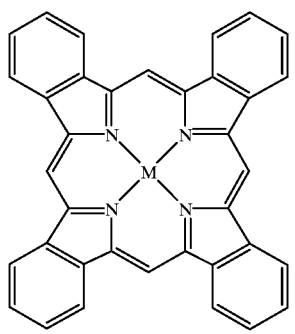
Phthalocyanine M(Pc)
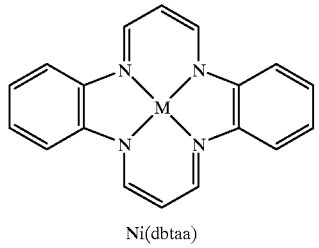
Ni(dbtaa)
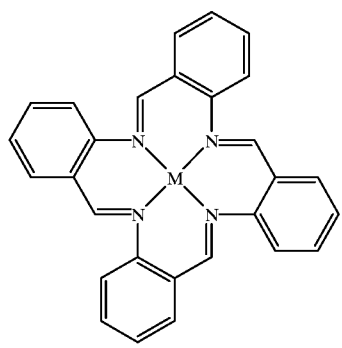
M (TAAB)
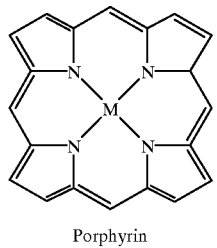
Porphyrin
-continued
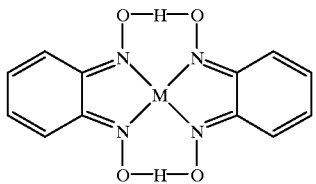
M(bqd)$_2$
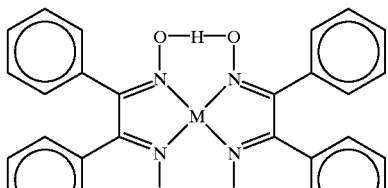
M(bqd)$_2$
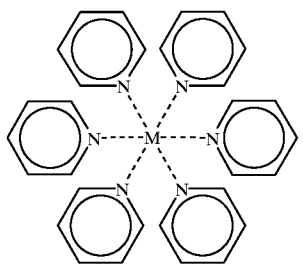
M(bpy)$_3$
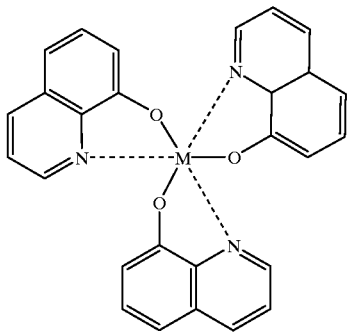
(D5) Cyanine dye donors
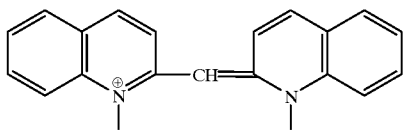
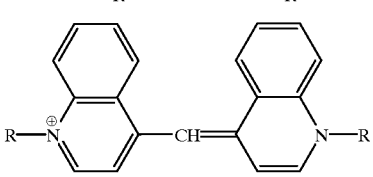
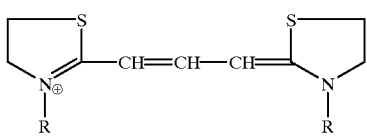

-continued

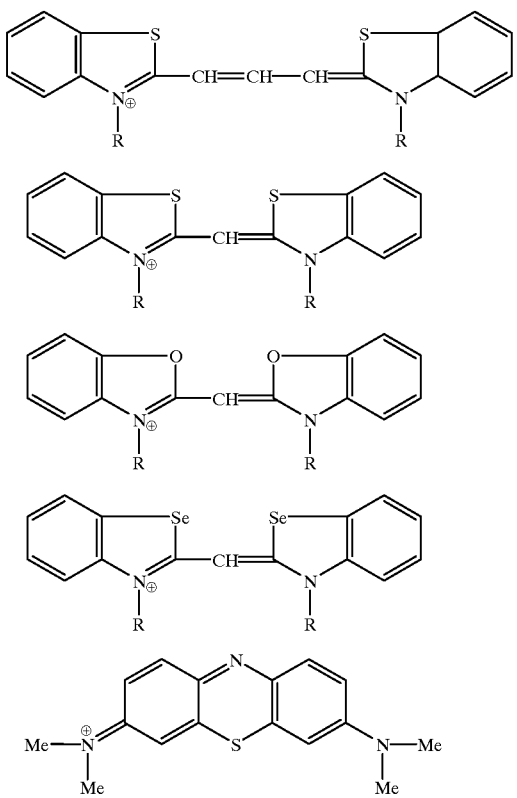

(D6) Nitrogen-containing heterocyclic donors

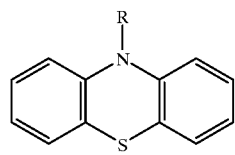
Phenothiazine

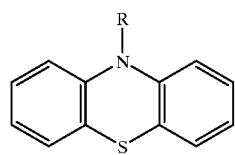
Phenazine

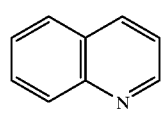
Quinoline

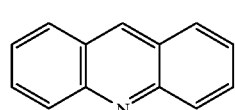
Acridine

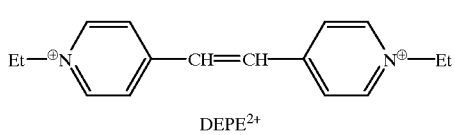
DEPE$^{2+}$

-continued (D7) Polymer donors

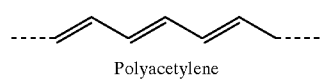
Polyacetylene

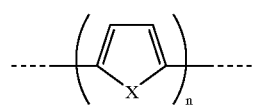
Polypyrrole [X = O, N, S]

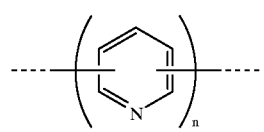
Polypyridine

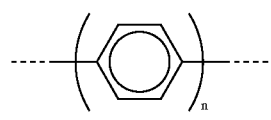
Poly-p-phenylene

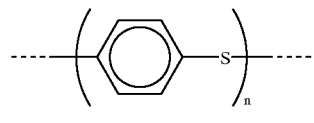
Poly-p-phenylenesulfide ($\phi$ is a phenyl group)
(R is a hydrogen atom or an alkyl group)
(M is a metal atom)
(Me is a methyl group)
(Et is an ethyl group)

(A1) Cyano compound acceptors

TCNQ

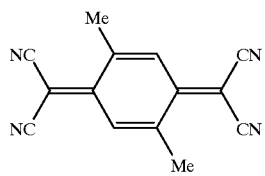
Me$_2$TCNQ

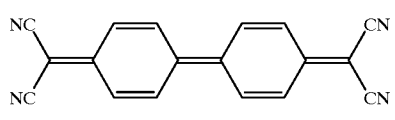
TCNDQ

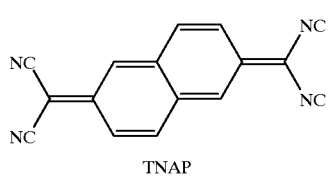
TNAP

-continued

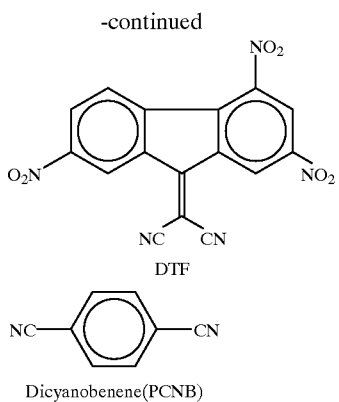
DTF

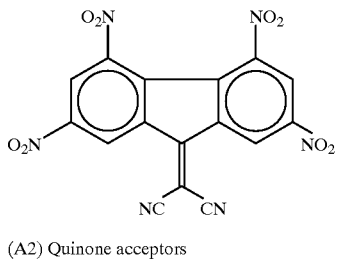
Dicyanobenene(PCNB)

(A2) Quinone acceptors

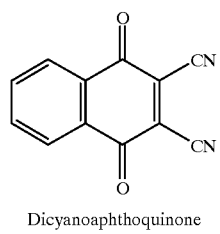
Dicyanoaphthoquinone

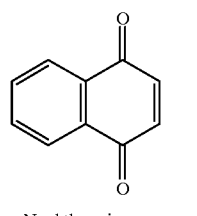
Naphthoquinone

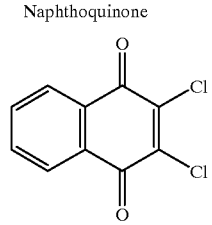
2,3-dichloronaphthoquinone

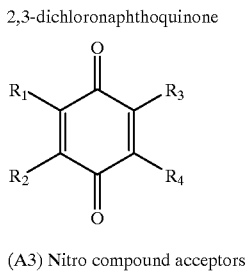
(A3) Nitro compound acceptors

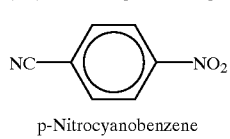
p-Nitrocyanobenzene

-continued

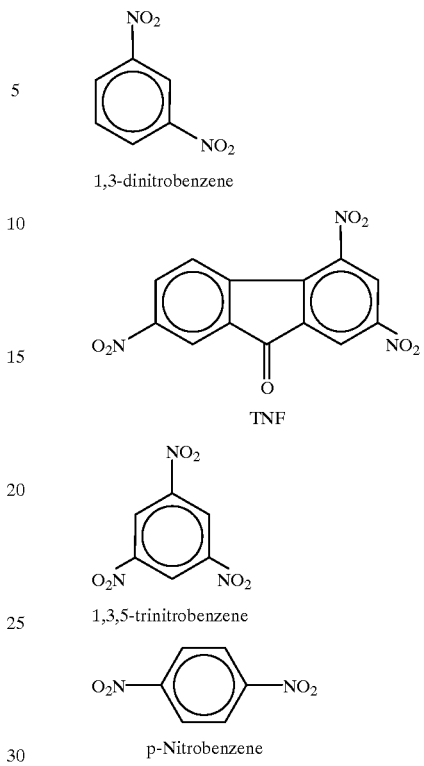

1,3-dinitrobenzene

TNF 1,3,5-trinitrobenzene p-Nitrobenzene (A4) Quinodiimine acceptors

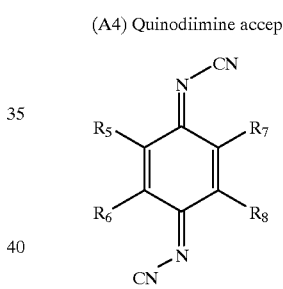

(Each of $R_1$ to $R_4$ represents a hydrogen atom, a halogen atom, an alkyl group, an alkenyl group, an aryl group, an alkyloxy group, an alkylthio group, an alkyloxycarbonyl group, a cyano group, a nitro group, a hydroxyl group, an amino group, a carboxyl group, an acetyl group, or a formyl group.)
(Each of $R_5$ to $R_8$ represents a hydrogen atom, a halogen atom, an alkyl group, an alkenyl group, an aryl group, an alkyloxy group, an alkylthio group, an alkyloxycarbonyl group, a cyano group, a nitro group, a hydroxyl group, an amino group, a carboxyl group, an acetyl group, or a formyl group.)

Examples of Z in formula $Z-(X-Y)_n$

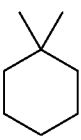
(Z-1)

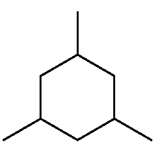
(Z-2)

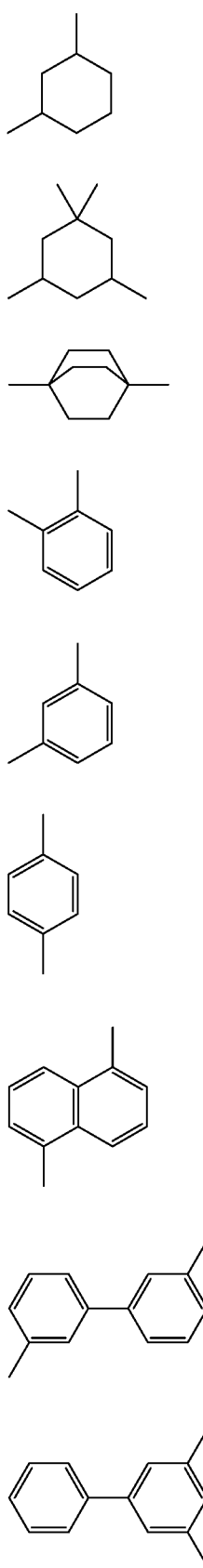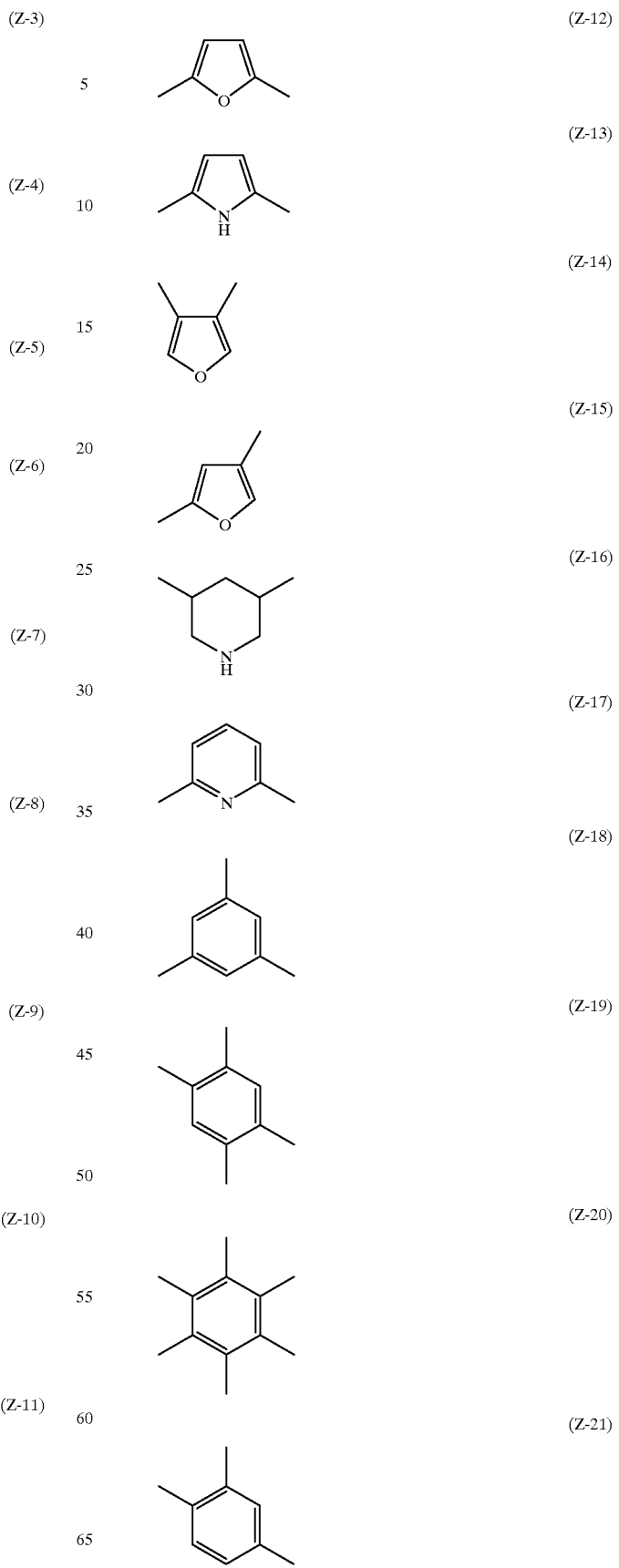

(Z-22) 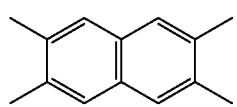
(Z-23) 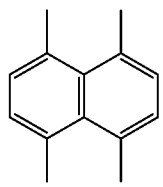
(Z-24) 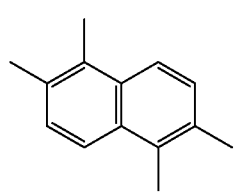
(Z-25) 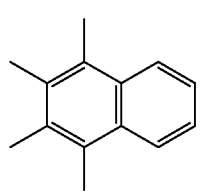
(Z-26) 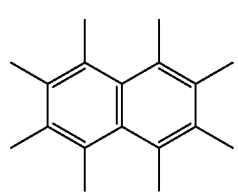
(Z-27) 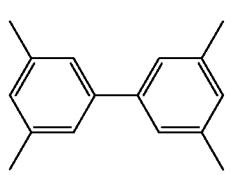
(Z-28) 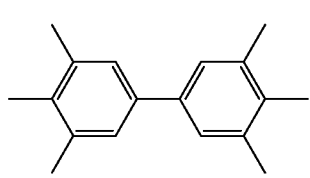
(Z-29) 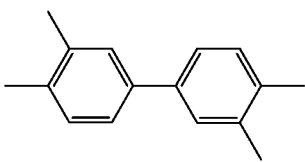
(Z-30) 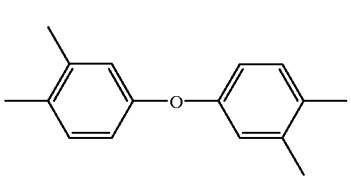
(Z-31) 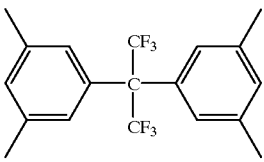
(Z-32) 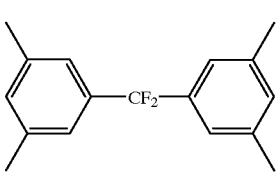
(Z-33) 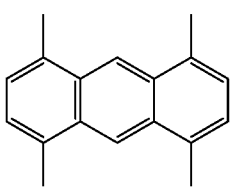
(Z-34) 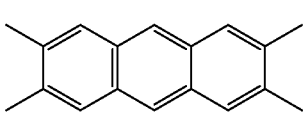
(Z-35) 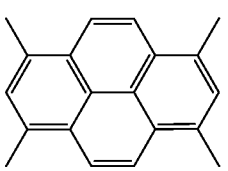
(Z-36) 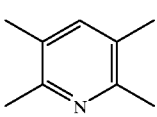
(Z-37) 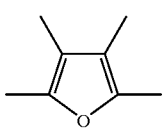

-continued
(Z-38) 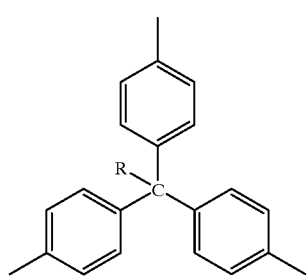
(Z-39) 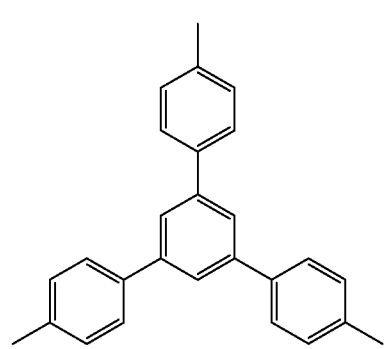
(Z-40) 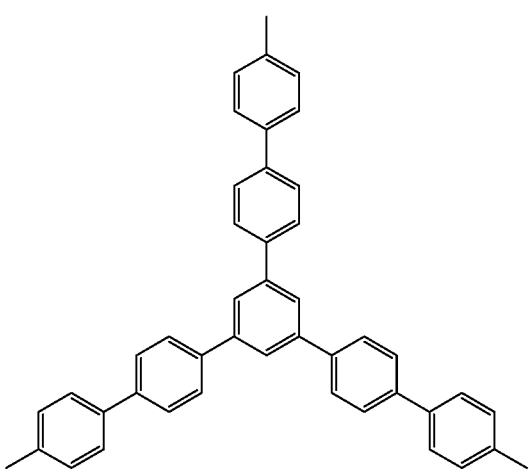
(Z-41) 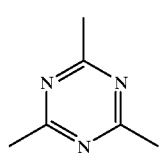
-continued
(Z-42) 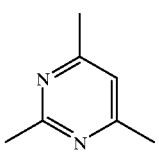
(Z-43) 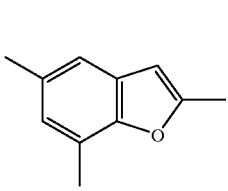
(Z-44) 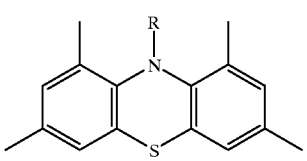
(Z-45) 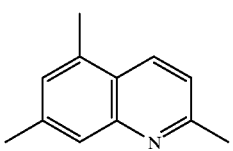
(N-46) 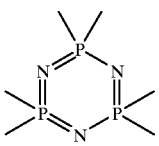
(Z-47) 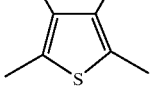
(R is a hydrogen atom or alkyl group)
(Z-48) 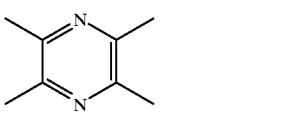
(Z-49) 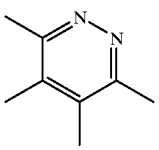
(Z-50) 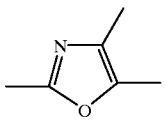

-continued (Z-51) 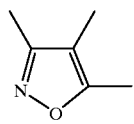

(Z-52) 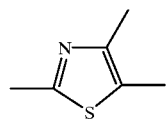

(Z-53) 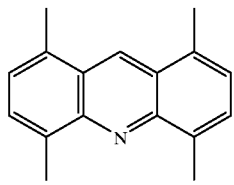

(Z-54) 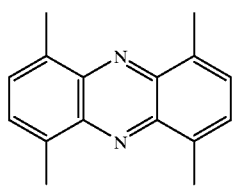

(Z-55) 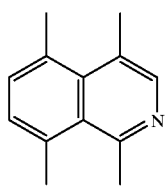

(Z-56) 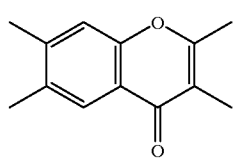

(Z-57) 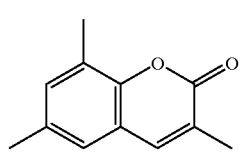

(Z-58) 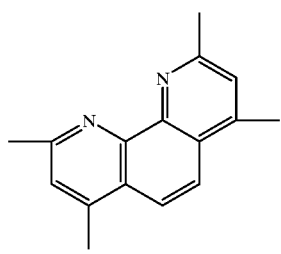

Examples of X in formula $Z-(X-Y)_n$

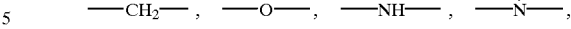

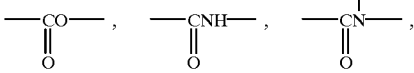

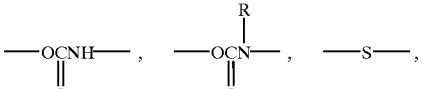

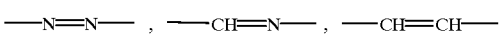

A recording-reproducing apparatus for the above recording medium 10 will be described below with reference to FIG. 7.

FIG. 7 is a perspective view schematically showing a recording-reproducing apparatus according to one embodiment of the present invention. Referring to FIG. 7, this recording-reproducing apparatus 30 comprises an XYZ stage 31 on which the recording medium 10 is placed, a laser 32, an NSOM optical fiber probe 33, a lens 34, and a photodetector 35.

The XYZ stage 31 can horizontally move the recording medium 10 in two directions parallel to the substrate surface and one direction perpendicular to the substrate surface. That is, the XYZ stage 31 serves as both a moving means for moving the recording medium 10 and a control means for controlling the distance between the recording medium 10 and the probe 33 and the distance between the recording medium 10 and the lens 34.

In the recording-reproducing apparatus 30 shown in FIG. 7, the XYZ stage 31 for moving the recording medium 10 is used as the moving means and the control means. However, these means are not particularly restricted as long as the means can move the recording medium 10 relative to the probe 33 and the lens 34. Also, the XYZ stage 31 functions as both the moving means and the control means in FIG. 7, but the moving means and the control means can be separately provided. Furthermore, when information is recorded by using an electrical means, an electrode is preferably formed on the surface or the like of the XYZ stage 31, which is brought into contact with the recording medium 10, in order to keep the lower electrode (not shown) of the recording medium 10 at a predetermined potential.

The laser 32 is used as a light source of excitation light 36 for exciting the luminescent material when information recorded on the recording medium 10 is to be reproduced. The laser 32 can also be used as a part of a means for charging the charge holding region of the recording medium 10. That is, the charge holding region can be charged by irradiating the laser beam 32 generated by the laser 32 toward the charge holding region of the recording medium 10 via the probe 32. If this is the case, however, it is commonly necessary that the wavelength of this laser beam be different from the wavelength of the excitation light. When information is recorded by using an optical means, therefore, it is preferable to use two lasers generating laser beams with different wavelengths in recording and reproduction.

The excitation light is not particularly limited to a laser beam so long as the light can excite the luminescent material and cause an emission of the material. The light used in information recording is also not particularly limited to a laser beam provided that the light can generate electron-hole pairs.

As described above, the probe 33 is used to guide the laser beam generated by the laser 32 to the charge holding region of the recording medium 10. The end portion of the probe 33 is preferably controllable to a desired potential. Electric charge can be injected into the charge holding region of the recording medium 10 by bringing the end portion of the probe 33 into contact with the charge holding region. That is, information can be recorded by an electrical means. The information thus recorded can be erased by bringing the end portion of the probe 33 into contact with the charge holding region while holding the end portion at a potential opposite to that in the recording. When information is thus recorded by an electrical means, it is also possible to exclusively use the probe 33 to guide the excitation light 36 to the recording medium 10 and additionally provide a probe for injecting electric charge.

The lens 34 is used to send luminescence from the luminescent material to the photodetector 35 when information recorded in the recording medium 10 is to be reproduced. The photodetector 35 is used to detect the intensity of the luminescence from the luminescent material. To send the luminescence from the lens 34 to the photodetector 35, it is also possible to arrange an optical fiber between the lens 34 and the photodetector 35.

Examples of the present invention will be described below. The formulas of the materials used in the examples of the present invention are as follows.

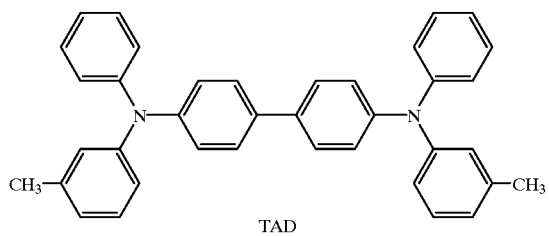

TAD

TTPAE

NTCl

Alq³

Phthalocyanine  M = Cu

EXAMPLE 1

Figure 8:
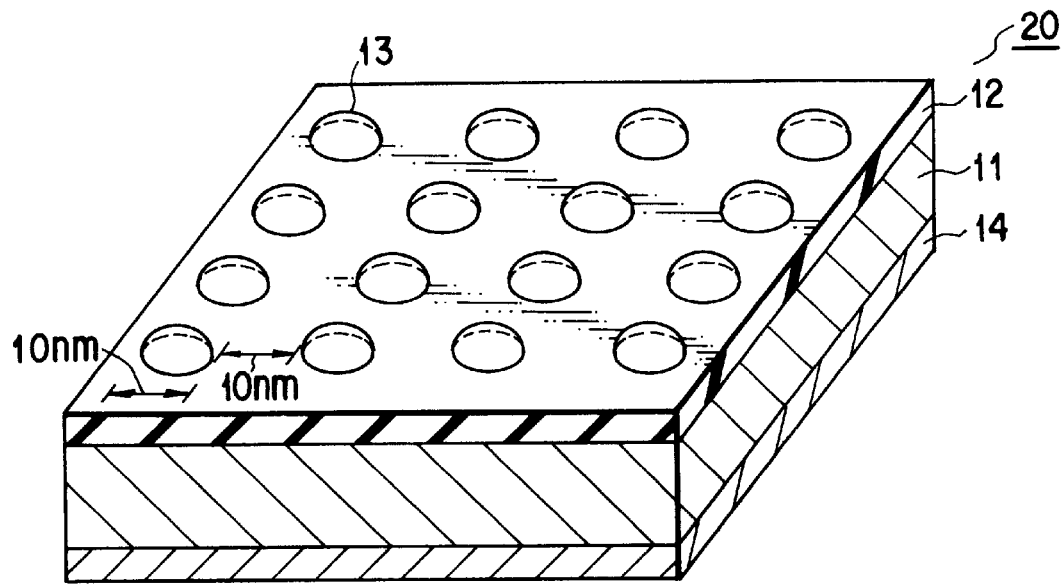
FIG. 8 is a perspective view showing a recording medium according to one example of the present invention.

FIG. 8 is a perspective view showing a recording medium according to one example of the present invention.

In FIG. 8, reference numeral 11 denotes a silicon substrate, and a 20-nm thick SiO$_2$ film 12 is formed by thermal oxidation on one major surface of the silicon substrate 11. An Au/Cr lower electrode 14 is formed on the other major surface of the silicon substrate 11. Note that a substrate made from a conductive material can also be used as the substrate 11 instead of a semiconductor substrate such as a silicon substrate.

Dome-like charge holding regions 13 made of TTPAE molecules represented by the above formula are arranged in a matrix manner on the SiO$_2$ film 12. Note that the TTPAE molecule is a donor dye molecule which emits luminescence when irradiated with excitation light of a predetermined wavelength. Note also that 4×4 charge holding regions 13 are arranged in FIG. 8, but a larger number of charge holding regions 13 are arranged in an actual recording medium.

To realize super-high density recording of terabits/cm$^2$ or more, the diameter of the charge holding region 13 was set to about 10 nm, and the spacing between adjacent charge holding regions 13 was set to about 10 nm.

These charge holding regions 13 were formed by forming a 20-nm thick even TTPAE film on the SiO$_2$ film 12 and drawing a predetermined pattern on this TTPAE film by using an electron beam focused to a spot diameter of 10 nm.

To record information on a recording medium 20 described above, the recording medium 20 was first placed on a table. This recording medium 20 was in an initial state in which no information was recorded.

Next, an NSOM optical fiber probe was moved close to the recording medium 20. By using this optical fiber probe, a laser beam with a wavelength of 457 nm generated by an Ar ion laser was irradiated on a recording area of the recording medium 20. Consequently, the luminescent material in the recording area was excited, and the resultant luminescence was observed. The aperture diameter of the light exit surface of this optical fiber probe is preferably 20 nm or less. This is to prevent the laser beam from being simultaneously irradiated on two or more charge holding regions 13.

Also, an ND filter was placed between the Ar ion laser and the probe so that the intensity of the laser beam incident on one end face of the optical fiber was adjusted to 0.2 mW. In this case a 1-nW laser beam was emitted from the end portion of the optical fiber probe.

Luminescence from the surface of the recording medium 20 was detected as follows. That is, a pickup convex lens having a diameter of 3 mm and an NA (Numerical Aperture) of 0.6 was placed in the vicinity of an optical fiber for detection. Luminescence condensed by the convex lens was guided to a photomultiplier (photodetecting means) through the optical fiber and detected.

The position of the NSOM optical fiber probe was controlled by a tapping mode. The optical fiber probe was moved close to the surface of the recording medium 20, and the optical fiber probe was two-dimensionally scanned while feedback was so performed that the amount of change in amplitude of the optical fiber probe was constant in the regions where the amplitude of the probe changed by the effect of the surface of the recording medium 20. In this manner a luminescent image was observed. If necessary, the position of the optical fiber probe for detection can also be controlled.

Scanning is performed, for example, by horizontally moving the recording medium back and forth and from side to side. If it is necessary to largely move the recording medium 20 for scanning, scanning can also be performed by rotating the recording medium 20. It is also possible to scan by combining the rotation and horizontal movement. The horizontal movement is performed by a moving mechanism using a piezoelectric element or the like. The rotation is performed by a moving mechanism using a motor or the like.

Figure 9:
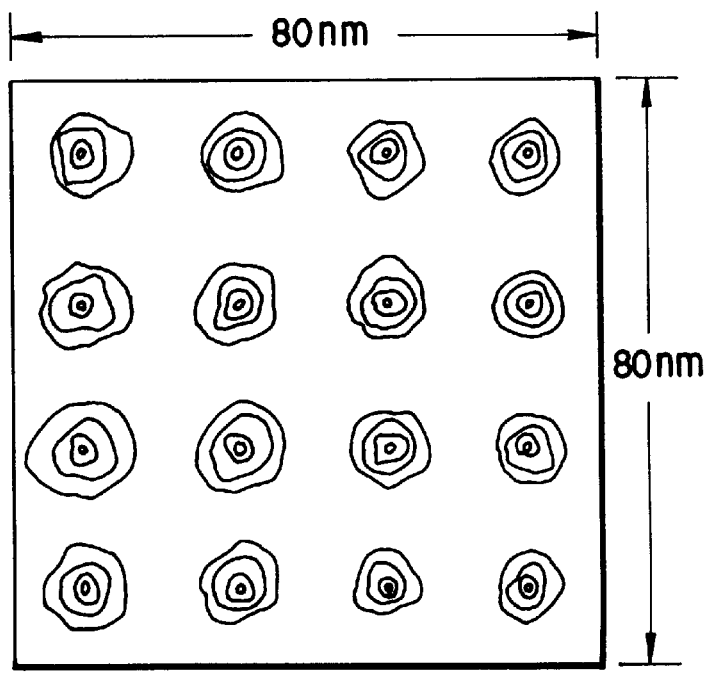
FIG. 9 is a view schematically showing an NSOM luminescent image in the recording medium according to the example shown in FIG. 8.

FIG. 9 shows an NSOM luminescent image obtained as above.

FIG. 9 is a view schematically showing an NSOM luminescent image of the recording medium according to one example of the present invention. Referring to FIG. 9, the intensity of luminescence is indicated by using contour lines. FIG. 9 shows only an 80 nm×80 nm area.

As shown in FIG. 9, luminescence with a wavelength of 540 nm was detected from regions corresponding to the charge holding regions 3, and a luminescent pattern corresponding to the pattern of arrangement of the charge holding regions 3 was obtained.

Subsequently, a voltage was so applied that the potential of Al covering the end portion of the NSOM optical fiber probe was +2.0 V with respect to the lower electrode 14 of the recording medium 20. Information was recorded by bringing the end portion of the optical fiber probe into contact with each of seven charge holding regions 3 within the range of the 80 nm×80 nm area described above. Thereafter, the optical fiber probe was moved away from the recording medium 20, and the application of the voltage was stopped. In this state, the optical fiber probe was again moved close to the recording medium 20 to observe the NSOM image, i.e., reproduce the recorded information.

Figure 10:
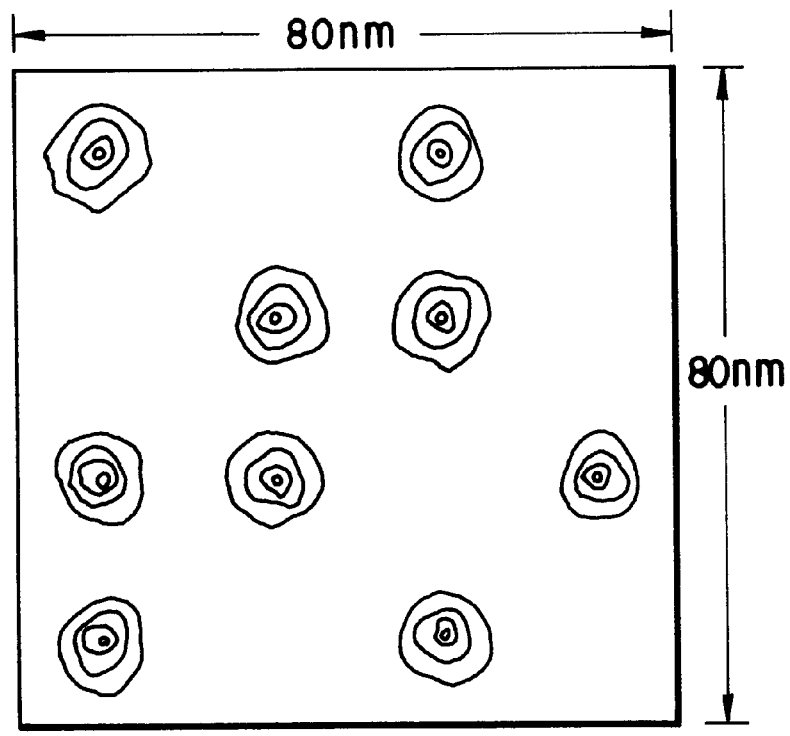
FIG. 10 is a view schematically showing an NSOM luminescent image in the recording medium according to the example shown in FIG. 8.

FIG. 10 shows an NSOM luminescent image obtained as above.

FIG. 10 is a view schematically showing the NSOM luminescent image of the recording medium according to one example of the present invention. Referring to FIG. 10, the intensity of luminescence is indicated by using contour lines. Also, FIG. 10 shows only the 80 nm×80 nm area described above.

As shown in FIG. 10, no luminescence was detected from regions corresponding to the charge holding regions 3 into which electric charge was injected by the NSOM optical fiber probe. That is, a luminescent pattern lacking luminescent spots corresponding to the charge holding regions 3 into which electric charge was injected was obtained.

The size of a region in which a luminescent spot was produced and disappeared was equivalent to the size (domain size) of the charge holding region 3, i.e., 10 nm. Furthermore, this luminescent image did not change at all even after an elapse of a few days and the recording lifetime calculated from a change in the luminescence intensity with time was on the order of a few tens of years.

The recorded information was erased by applying a voltage of −2.0 V to Al covering the end portion of the NSOM optical fiber probe and bringing the end portion of the optical fiber probe into contact with each of the charge holding regions 3 in which the information was recorded, thereby removing the injected electric charge. In this manner, information recorded by using an electrical means can be erased by removing electric charge held in the charge holding region 3.

After the recorded information was erased as above, the application of the voltage to the end portion of the optical fiber probe was stopped, and the optical fiber probe was again moved close to the recording medium 20 to observe an NSOM luminescent image. Consequently, luminescence was detected in all regions corresponding to the charge holding regions 3, indicating that the recorded information was completely erased.

EXAMPLE 2

In Example 1 described above, the luminescent material is contained in the charge holding region 3. In this example, the luminescent material is not contained in the charge holding region 3, and the material is contained in a separately formed layer 4.

Figure 11:
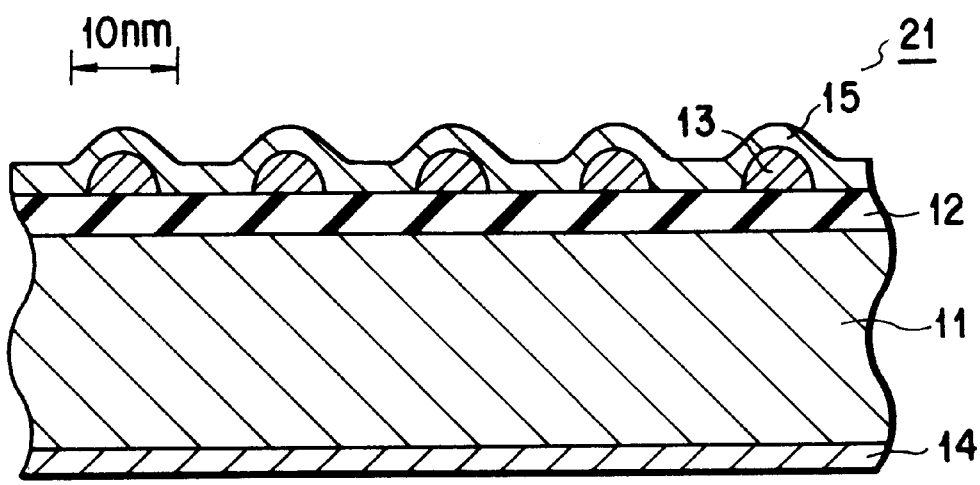
FIG. 11 is a sectional view showing a recording medium according to another example of the present invention.

FIG. 11 is a sectional view of a recording medium according to another example of the present invention. The same reference numerals as in the recording medium 20 shown in FIG. 7 denote the same parts in FIG. 11, and a detailed description thereof will be omitted.

Referring to FIG. 11, a 20-nm thick $SiO_2$ film 12 is formed by thermal oxidation on one major surface of a silicon substrate 11. A lower electrode 14 is formed on the other major surface of the silicon substrate 11. The size of the silicon substrate 11 is the same as the substrate used in Example 1. On the $SiO_2$ film 12, charge holding regions 13 consisting of TAD molecules as donor molecules represented by the formula presented earlier are arranged in a matrix manner.

The diameter of the charge holding region 13 is about 10 nm, and the spacing between adjacent charge holding regions 13 is about 10 nm. Note that the charge holding regions 13 of the above size were formed by forming a 20-nm thick even TAD film on the $SiO_2$ film 12 and drawing a predetermined pattern on this TAD film by using an electron beam focused to a spot size of 10 nm.

On the $SiO_2$ film 12 on which the charge holding regions 13 are formed, a 5-nm thick continuous layer 15 consisting of $Alq_3$ molecules as luminescent dye molecules represented by the formula presented earlier is formed by vapor deposition.

Information recording on a recording medium 21 formed as above was performed by bringing an NSOM optical fiber probe, to which positive electric charge was applied, into contact with the continuous layer 15 formed on the charge holding regions 13. Since the electron donating properties of $Alq_3$ were slightly weaker than those of TAD, holes were injected from the optical fiber probe into the charge holding regions 13 through the continuous layer 15.

An NSOM luminescent image of the information recording medium 21 in which information was thus recorded was observed. That is, the recorded information was reproduced. This reproduction was performed following the same procedures as in Example 1.

Consequently, no luminescence was detected in regions corresponding to the charge holding regions 13 into which the holes were injected. Also, luminescence with a wave-length of 530 nm emitted by $Alq_3$ contained in the continuous film 15 was detected in regions corresponding to the other charge holding regions 13. That is, the information was, in fact, recorded. Additionally, the recording lifetime was on the order of a few tens of years as in Example 1. That is, extremely highly stable recording could be realized.

EXAMPLE 3

In this example, as in Example 2, the luminescent material is not contained in the charge holding regions 3, and the material is contained in a separately formed layer 4. In Examples 1 and 2, information was recorded by using an electrical means. In this example, information is recorded by using an optical means.

Figure 12:
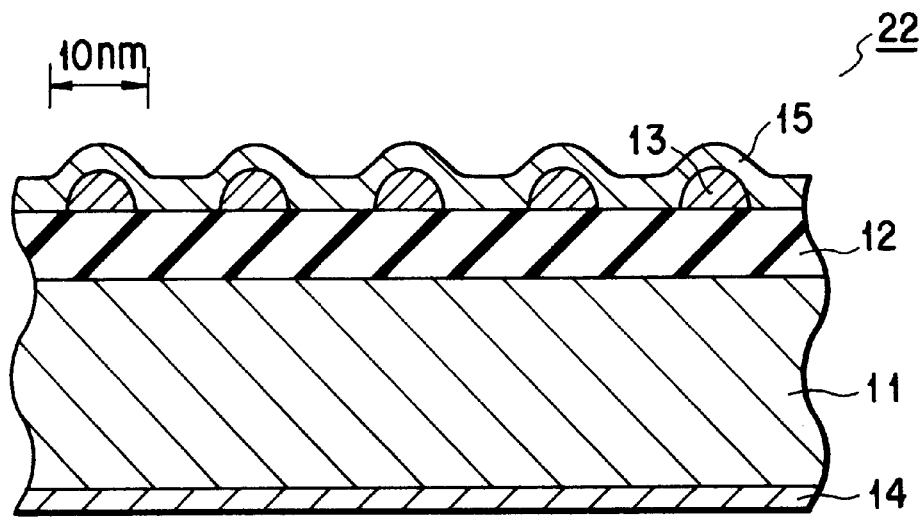
FIG. 12 is a sectional view showing a recording medium according to still another example of the present invention.

FIG. 12 is a sectional view of a recording medium according to still another example of the present invention. The same reference numerals as in the recording medium 20 shown in FIG. 7 denote the same parts in FIG. 12, and a detailed description thereof will be omitted.

Referring to FIG. 12, a 100-nm thick $SiO_2$ film 12 is formed by thermal oxidation on one major surface of a silicon substrate 11. A lower electrode 14 is formed on the other major surface of the silicon substrate 11. On the $SiO_2$ film 12, charge holding regions 13 consisting of TTPAE molecules as donor molecules are arranged in a matrix manner. The size of the silicon substrate 11, the size and formation method of the charge holding regions 13, and the spacing between the charge holding regions 13 are the same as in Example 1.

On the $SiO_2$ film 12 on which the charge holding regions 13 are formed, a continuous layer 15 consisting of NTCI molecules as luminescent acceptor dye molecules represented by the formula presented earlier is formed by vapor deposition. Note that the vapor deposition amount of NTCI is equivalent to a vapor deposition amount when a 3-nm thick even NTCI film is formed on the surface of the $SiO_2$ film 12.

Information was recorded on a recording medium 22 formed as above by irradiating light to the continuous layer 15 formed on the charge holding regions 13. That is, a xenon lamp was used as a light source, and light from this light source was passed through a spectro-scope to obtain a light component with a wavelength of 355 nm. This light component was guided to an optical fiber probe and irradiated toward four charge holding regions 13 in an 80 nm×80 nm area.

In both the charge holding regions 13 and the continuous layer 15, the light component with a wave-length of 355 nm is absorbed to generate electron-hole pairs. The electrons move to the continuous layer 15 consisting of acceptor molecules (NTCI molecules). The holes move to the charge holding regions 13 consisting of donor molecules (TTPAE molecules). Consequently, an electric double layer is locally formed in a region irradiated with light.

An NSOM luminescent image of the information recording medium 22 in which information was thus recorded was observed. That is, the recorded information was reproduced. This reproduction was performed following the same procedures as in Example 1. The result is shown in FIG. 13.

Figure 13:
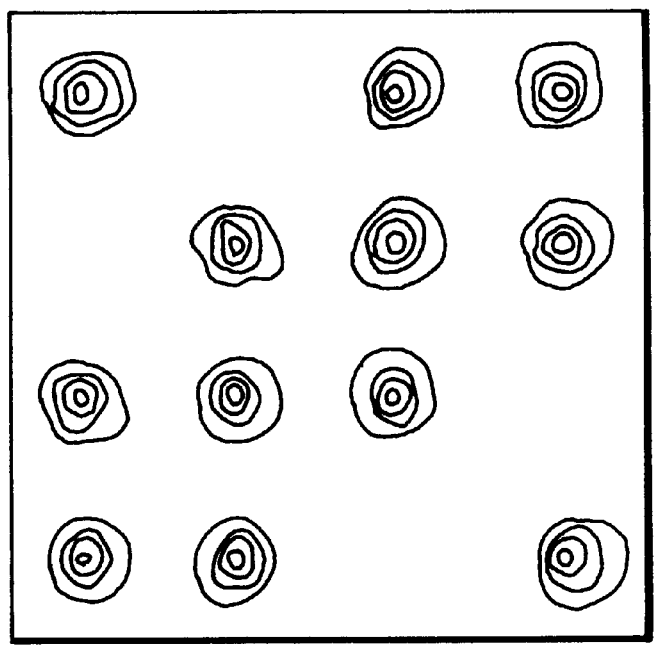
FIG. 13 is a view schematically showing an NSOM luminescent image in the recording medium according to the example shown in FIG. 12.

FIG. 13 is a view schematically showing the NSOM luminescent image of the recording medium according to still another example of the present invention. Referring to FIG. 13, the intensity of luminescence is indicated by using contour lines. Also, FIG. 13 shows only the 80 nm×80 nm area described above.

As shown in FIG. 13, no luminescence was detected from regions corresponding to the charge holding regions 3 irradiated with the light at a wavelength of 355 nm. That is, a luminescent pattern lacking luminescent spots corresponding to the charge holding regions 3 into which electric charge was injected was obtained.

The recorded information was erased by using an electrical means. First, a voltage of −2.0 V was applied to A1 covering the end portion of an NSOM optical fiber probe. The end portion of the optical fiber probe in this state was moved close to the charge holding regions 13 in which the information was recorded. As a consequence, the holes in the charge holding regions 13 and the electrons in the continuous layer 15 recombined due to a local electric field formed by the electric charge at the end of the optical fiber probe, and the locally generated electric double layer disappeared. In this manner, information recorded by an optical means can be erased by forming a local electric field to make electrons and holes recombine.

After the recorded information was erased as above, the application of the voltage to the end portion of the NSOM optical fiber probe was stopped, and the optical fiber probe was again moved close to the recording medium 22 to observe an NSOM luminescent image. Consequently, luminescence was detected in all regions corresponding to the charge holding regions 3, indicating that the recorded information was completely erased.

EXAMPLE 4

In Example 3, a recording medium having a two-layered structure (single hetero structure) in which a donor-molecule layer and an acceptor-molecule layer were stacked was used, and information was recorded by generating electron-hole pairs in both of these layers. Example 4 uses a recording medium having a three-layered structure (double heterojunction structure) in which a donor-molecule layer, an acceptor-molecule layer, and a dye-molecule layer are stacked. Information is recorded by generating electron-hole pairs in the dye-molecule layer.

The recording medium of this example was manufactured by the following method. First, as in Example 1, an $SiO_2$ film was formed on a silicon substrate by thermal oxidation. On this $SiO_2$ film, charge holding regions 10 nm in diameter were formed by using TTPAE molecules as luminescent donating dye molecules. Subsequently, on the $SiO_2$ film on which the charge holding regions were formed, a first continuous layer (thickness 50 nm) made from phthalocyanine copper represented by the formula presented earlier and a second continuous layer (thickness 50 nm) made from NTCI molecules as acceptor molecules were sequentially stacked, thereby manufacturing the recording medium. Note that phthalocyanine copper is a blue dye molecule.

Information recording on this recording medium was performed by irradiating light onto the first continuous layer on the charge holding regions. That is, a red semiconductor laser was used as a light source, and a red laser beam with a wavelength of 680 nm from this light source was guided to an optical fiber probe and irradiated toward several charge holding regions. The red laser beam with a wavelength of 680 nm is not absorbed in the charge holding regions and the second continuous layer, i.e., the laser beam is absorbed only in the first continuous layer. As a consequence, electron-hole pairs are generated in the first continuous layer. The electrons move to the second continuous layer consisting of acceptor molecules (NTCI molecules). The holes move to the charge holding regions consisting of donor molecules (TTPAE molecules). Accordingly, an electric double layer is locally formed in a region irradiated with light.

An NSOM luminescent image of the information recording medium in which information was thus recorded was observed. That is, the recorded information was reproduced. Note that this reproduction was performed by irradiating a laser beam with a wavelength of 457 nm as in Example 1. Consequently, no luminescence from TTPAE molecules was detected in recording areas irradiated with the red laser beam. Also, luminescence with a wavelength of 540 nm from TTPAE molecules was detected in recording areas not irradiated with the red laser beam. Note that the first continuous layer made from phthalocyanine copper absorbs light at a wave-length of 680 nm and transmits light at wavelengths of 457 nm and 540 nm.

EXAMPLE 5

In Examples 1 to 4, charge holding regions about 10 nm in diameter were formed, and one charge holding region was used as a unit recording area. In Example 5, charge holding regions of a smaller size are formed, and each unit recording area is constituted by a plurality of charge holding regions.

When a low-molecular organic compound such as TTPAE or TAD is formed into a film by vapor deposition, the compound usually forms an amorphous. Especially when the vapor deposition amount is very small, the compound grows into a droplet form which is stable in terms of surface energy. That is, the compound self-organizes a domain structure. By using this phenomenon, therefore, charge holding regions can be formed without drawing a pattern using an electron beam or the like.

In this example, as in Example 1, a silicon substrate on one major surface of which an $SiO_2$ film was formed and on the other major surface of which a lower electrode was formed was used. A recording medium was formed by vapor-depositing TTPAE on the surface of the $SiO_2$ film. Note that the vapor deposition amount is equivalent to 0.1 nm as a film thickness when a flat TTPAE film is formed. The surface of the $SiO_2$ film on which TTPAE was thus vapor-deposited was checked by surface unevenness observation using an AFM, and charge holding regions 2 nm in diameter were formed at intervals of 2 nm.

Next, a voltage was so applied that the potential of Al covering the end portion of an NSOM optical fiber was +2.0 V with respect to the lower electrode of the recording medium, and the end portion of the optical fiber probe was brought into contact with the surface on which the charge holding regions were formed, thereby recording information. At this time, the end portion of the probe contacted a plurality of charge holding regions at the same time. That is, a plurality of charge holding regions constituted a unit recording area. Also, the probe contact to the surface on which the charge holding regions were formed was performed in 3×3 portions at intervals of 20 nm.

An NSOM luminescent image of the recording medium in which information was thus recorded was observed. That is, the recorded information was reproduced. The result is shown in FIGS. 14 and 15.

FIG. 14 is a view schematically showing the NSOM luminescent image of the recording medium according to still another example of the present invention. Referring to FIG. 14, the intensity of luminescence is indicated by using contour lines. FIG. 15 is a graph showing the luminescence intensity of the recording medium according to still another example of the present invention. The data shown in FIG. 15 was obtained by line scanning the luminescence intensity along a solid line A—A in FIG. 14. Referring to FIG. 15, the abscissa indicates the distance from the start point, and the ordinate indicates the luminescence intensity.

As shown in FIGS. 14 and 15, no luminescence was substantially detected from regions with which the NSOM optical fiber probe had gotten in contact, and luminescence having high intensity was detected from other regions. That is, the recording information could be reproduced. Also, the recorded information could be erased following the same procedures as described in Example 1.

As described above, recording, reproduction, and erasure of information were possible even when charge holding regions were formed in a self-organization manner by vapor deposition.

In the present invention as has been described above, information is recorded by injecting electric charge into charge holding regions. Therefore, a high recording rate (write speed) is realized. Additionally, in the present invention a plurality of charge holding regions form a domain structure. Accordingly, it is possible to stabilize recording and facilitate miniaturizing each unit recording area and controlling the size of the unit recording area. Furthermore, in the present invention recorded information is reproduced by using the luminescence characteristics of a luminescent material. Consequently, luminescence as a reproduction signal can be detected at high sensitivity, and a signal corresponding to information "0" and a signal corresponding to information "1" can be easily discriminated.

In the present invention, therefore, even when the size of the unit recording area is on a nanometer scale (the wavelength of light or smaller), it is possible to obtain a high-intensity reproduction signal, control the unit recording area size with high accuracy, and perform super-high density recording of terabits/$cm^2$ or more at a high recording and reproducing rate.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording medium comprising:

an electrically insulating under-layer; and a plurality of charge holding regions juxtaposed at predetermined intervals on said under layer, each of said charge holding regions containing a luminescent material and being capable of holding one of positive electric charge or negative electric charge, and one or more of said charge holding regions corresponding to one bit.

2. A medium according to claim 1, wherein said luminescent material contains donor luminescent molecules.

3. A medium according to claim 1, wherein said luminescent material contains acceptor luminescent molecules.

4. A medium according to claim 1, further comprising a layer arranged adjacent to said charge holding regions and containing a donor or acceptor.

5. A medium according to claim 4, wherein each of said charge holding regions can hold positive electric charge, and an ionization potential of the material forming said layer arranged adjacent to said charge holding regions is higher by at least 0.1 eV than an ionization potential of the material forming said charge holding regions.

6. A medium according to claim 4, wherein each of said charge holding regions can hold negative electric charge, and electron affinity of the material forming said layer arranged adjacent to said charge holding regions is lower by at least 0.1 eV than electron affinity of the material forming said charge holding regions.

7. A medium according to claim 1, further comprising a conductive layer on a back surface of said under-layer away from a surface on which said charge holding regions are formed.

8. A recording medium comprising:

an electrically insulating under-layer;

a plurality of charge holding regions juxtaposed at predetermined intervals on said under-layer, each of said charge holding regions being capable of holding one of positive electric charge or negative electric charge, and one or more of said charge holding regions corresponding to one bit; and a light emitting region arranged adjacent to said charge holding regions and containing a luminescent material.

9. A medium according to claim 8, wherein each of said charge holding regions can hold positive electric charge, and an ionization potential of the material forming said light emitting region is higher by at least 0.1 eV than an ionization potential of the material forming said charge holding regions.

10. A medium according to claim 8, wherein each of said charge holding regions can hold negative electric charge, and electron affinity of the material forming said light emitting region is lower by at least 0.1 eV than electron affinity of the material forming said charge holding regions.

11. A medium according to claim 8, further comprising a conductive layer on a back surface of said under-layer away from a surface on which said charge holding regions are formed.

12. A recording method for recording information on a recording medium comprising a recording area having a plurality of charge holding regions juxtaposed at predetermined intervals, each of said charge holding regions being capable of holding one of positive electric charge or negative electric charge, at least a portion of said recording area containing a luminescent material, and one or more of said charge holding regions corresponding to one bit, comprising the step of:

charging at least one of said charge holding regions.

13. A method according to claim 12, wherein the step of charging is performed by using means selected from the group consisting of electrical means and optical means.

14. An erasing method for erasing information recorded on a recording medium comprising a recording area having a plurality of charge holding regions juxtaposed at predetermined intervals, each of said charge holding regions being capable of holding one of positive electric charge or negative electric charge, at least a portion of said recording area containing a luminescent material, and one or more of said charge holding regions corresponding to one bit, comprising the step of:

setting at least one of said charge holding regions in a non-charge state.

15. A reproducing method for reproducing information recorded on a recording medium comprising a recording area having a plurality of charge holding regions juxtaposed at predetermined intervals, each of said charge holding regions being capable of holding one of positive electric charge or negative electric charge, at least a portion of said recording area containing a luminescent material, and one or more of said charge holding regions corresponding to one bit, comprising the step of:

irradiating excitation light onto said recording area and detecting luminescence from said luminescent material in said recording area.

16. A reproducing apparatus for reproducing information recorded on a recording medium comprising a recording area having a plurality of charge holding regions juxtaposed at predetermined intervals, each of said charge holding regions being capable of holding one of positive electric charge or negative electric charge, at least a portion of said recording area containing a luminescent material, and one or more of said charge holding regions corresponding to one bit, comprising:

a light source of excitation light for exciting said luminescent material;

first light transmitting means for guiding the excitation light from said light source to said recording area;

photodetecting means for detecting luminescence from said luminescent material in said recording area;

second light transmitting means for guiding the luminescence from said recording area to said photodetecting means;

control means for controlling a distance between said first light transmitting means and said recording area and a distance between said second light transmitting means and said recording area; and moving means for horizontally moving, rotating, or horizontally moving and rotating, or horizontally moving and rotating said recording medium.

17. An apparatus according to claim 16, wherein at least one of said first and second light transmitting means comprises an optical fiber whose aperture diameter on a recording area side is in the range from 10 nm to 100 nm.

18. A recording reproducing apparatus for a recording medium comprising a recording area having a plurality of charge holding regions juxtaposed at predetermined intervals, each of said charge holding regions being capable of holding one of positive electric charge or negative electric charge, at least a portion of said recording area containing a luminescent material, and one or more of said charge holding regions corresponding to one bit, comprising:

means for charging at least one of said charge holding regions;

a light source of excitation light for exciting said luminescent material;

first light transmitting means for guiding the excitation light from said light source to said recording area;

photodetecting means for detecting luminescence from said luminescent material in said recording area;

second light transmitting means for guiding the luminescence from said recording area to said photodetecting mean;

control means for controlling a distance between said first light transmitting means and said recording area and a distance between said second light transmitting means and said recording area; and moving means for horizontally moving, rotating, or horizontally moving and rotating said recording medium.

19. An apparatus according to claim 18, further comprising means for setting said charge holding region in a non-charged state.

20. An apparatus according to claim 18, wherein said charging means charges said charge holding region by one method selected from the group consisting of an electrical method and an optical method.

* * * * *